US010881078B1

(12) United States Patent
Edmonds

(10) Patent No.: US 10,881,078 B1
(45) Date of Patent: Jan. 5, 2021

(54) ANIMAL ENCLOSURE

(71) Applicant: Edmonds Outdoors, LLC, Nashville, TN (US)

(72) Inventor: Addison Edmonds, Brentwood, TN (US)

(73) Assignee: Edmonds Outdoors, LLC, Nashville, TN (US)

( * ) Notice: Subject to any disclaimer, the term of this patent is extended or adjusted under 35 U.S.C. 154(b) by 0 days.

(21) Appl. No.: 16/285,095

(22) Filed: Feb. 25, 2019

Related U.S. Application Data

(63) Continuation of application No. 15/011,453, filed on Jan. 29, 2016, which is a continuation-in-part of application No. 14/452,010, filed on Aug. 5, 2014, and a continuation-in-part of application No. 29/539,652, filed on Sep. 16, 2015, now Pat. No. Des. 778,510.

(60) Provisional application No. 61/862,393, filed on Aug. 5, 2013, provisional application No. 62/109,606, filed on Jan. 29, 2015.

(51) Int. Cl.
*A01K 1/02* (2006.01)

(52) U.S. Cl.
CPC ............ *A01K 1/0245* (2013.01); *A01K 1/029* (2013.01)

(58) Field of Classification Search
CPC . A01K 1/02; A01K 1/03; A01K 1/033; A01K 1/034; A01K 1/0035; A01K 1/0236; A01K 1/0245; A01K 1/035
USPC .................................. 119/482, 496, 498–501
See application file for complete search history.

(56) References Cited

U.S. PATENT DOCUMENTS

| 138,111 | A | 4/1873 | Adriaans |
|---|---|---|---|
| 823,544 | A | 6/1906 | Parker |
| 1,020,349 | A | 3/1912 | Havard |
| 2,217,871 | A | 10/1940 | Lindgren |
| 2,313,591 | A | 3/1943 | Slaughter |

(Continued)

FOREIGN PATENT DOCUMENTS

| CN | 2764148 Y | 3/2006 |
|---|---|---|
| CN | 102037899 A | 5/2011 |

(Continued)

OTHER PUBLICATIONS

U.S. Appl. No. 29/644,742, filed Apr. 20, 2018, assignee Edmonds Outdoors, LLC.

(Continued)

*Primary Examiner* — Peter M Poon
*Assistant Examiner* — Danielle A Clerkley
(74) *Attorney, Agent, or Firm* — Waller Lansden Dortch & Davis LLP; Matthew C. Cox

(57) ABSTRACT

An animal enclosure includes a kennel body including a rotational molded wall formed from a plastic material. The kennel body defines an interior space shaped to accommodate one or more animals, and defines a door opening shaped to allow the animal to enter and exit the kennel body. A hoop-shaped door frame is disposed on the kennel body proximate the door opening. A door is disposed on the door frame, and the door is pivotally moveable relative to the door frame between an open position and a closed position. A latch is disposed on the door. The enclosure includes first, second, third and fourth attachment members disposed on the kennel body, each positioned to receive a strap to secure the kennel body to a structure such as a truck bed.

18 Claims, 35 Drawing Sheets

(56) References Cited

U.S. PATENT DOCUMENTS

| | | | |
|---|---|---|---|
| 2,464,709 A | 3/1949 | Orsini | |
| 2,544,505 A | 3/1951 | Kronhaus | |
| 2,678,628 A * | 5/1954 | Williams | A01K 1/0236 |
| | | | 119/496 |
| 2,790,414 A | 4/1957 | Rossow | |
| 3,536,044 A * | 10/1970 | Branam | A01K 1/031 |
| | | | 119/481 |
| 3,724,025 A | 4/1973 | Hicks | |
| 3,785,344 A | 1/1974 | Patterson | |
| 4,016,833 A * | 4/1977 | Ray | A01K 1/03 |
| | | | 119/498 |
| 4,090,472 A | 5/1978 | York | |
| 4,339,147 A | 7/1982 | Kimzey | |
| 4,525,952 A | 7/1985 | Cunningham et al. | |
| 4,561,526 A | 12/1985 | Winter et al. | |
| 4,575,109 A | 3/1986 | Cowdery | |
| 4,696,259 A | 9/1987 | Fewox | |
| 4,852,520 A | 8/1989 | Goetz | |
| 4,917,047 A * | 4/1990 | Wazeter, III | A01K 1/03 |
| | | | 119/474 |
| D308,429 S | 6/1990 | VanSkiver | |
| D308,588 S | 6/1990 | Goetz | |
| D312,333 S | 11/1990 | Van Skiver | |
| D314,251 S | 1/1991 | Van Skiver | |
| 5,154,137 A | 10/1992 | Stanaland | |
| 5,154,265 A | 10/1992 | Capistrant | |
| 5,168,829 A | 12/1992 | Dietrich | |
| D334,087 S | 3/1993 | Goetz | |
| 5,220,882 A | 6/1993 | Jenkins | |
| 5,253,612 A | 10/1993 | Goetz | |
| D351,688 S | 10/1994 | Northrop et al. | |
| 5,357,900 A | 10/1994 | Ho | |
| D352,573 S | 11/1994 | Sampson et al. | |
| 5,373,708 A | 12/1994 | Drumoulin, Jr. | |
| 5,467,734 A | 11/1995 | Ho | |
| 5,669,331 A | 9/1997 | Richmond | |
| 5,701,843 A | 12/1997 | Lazides | |
| 5,727,503 A | 3/1998 | Whittaker | |
| 5,911,763 A | 6/1999 | Quesada | |
| 5,931,120 A | 8/1999 | Burns et al. | |
| 5,934,425 A | 8/1999 | Sadow | |
| 5,967,090 A * | 10/1999 | Hui | A01K 1/0245 |
| | | | 119/453 |
| 6,021,740 A | 2/2000 | Martz | |
| D426,680 S | 6/2000 | Morley | |
| 6,095,088 A | 8/2000 | Savicki | |
| 6,223,691 B1 | 5/2001 | Beattie | |
| 6,230,656 B1 | 5/2001 | Walach | |
| D445,222 S | 7/2001 | Ross | |
| 6,345,591 B1 | 2/2002 | Richmond | |
| 6,427,631 B1 | 8/2002 | Ross | |
| 6,446,577 B1 | 9/2002 | Salahor | |
| D470,628 S | 2/2003 | Kinder et al. | |
| D471,676 S | 3/2003 | Kinder et al. | |
| 6,571,740 B1 | 6/2003 | Kinder et al. | |
| 6,698,812 B1 | 3/2004 | Stubbs | |
| 6,732,676 B1 | 5/2004 | Smith | |
| 6,766,769 B1 | 7/2004 | Doyle et al. | |
| 6,840,193 B2 | 1/2005 | Kost et al. | |
| 7,025,394 B1 | 4/2006 | Hunt | |
| 7,036,458 B1 | 5/2006 | Stornant | |
| 7,044,083 B2 | 5/2006 | Farmer et al. | |
| 7,070,190 B2 | 7/2006 | Sadow | |
| 7,090,242 B1 | 8/2006 | Sheinall et al. | |
| D529,666 S | 10/2006 | Simpson et al. | |
| 7,152,554 B2 | 12/2006 | Crawford | |
| D538,942 S | 3/2007 | Grundy | |
| 7,201,116 B2 * | 4/2007 | Axelrod | A01K 1/0245 |
| | | | 119/453 |
| D545,507 S | 6/2007 | Harper et al. | |
| D546,005 S | 7/2007 | Harper et al. | |
| 7,261,060 B1 | 8/2007 | Garofola et al. | |
| D551,399 S | 9/2007 | Harper et al. | |
| D555,292 S | 11/2007 | Harper et al. | |
| 7,322,315 B2 | 1/2008 | Brewer et al. | |
| 7,334,802 B2 | 2/2008 | Kaplan | |
| D566,907 S | 4/2008 | Barca | |
| D571,053 S | 6/2008 | Donnelly | |
| D571,054 S | 6/2008 | Donnelly | |
| D574,559 S | 8/2008 | You et al. | |
| D583,108 S | 12/2008 | Richardson | |
| D584,458 S | 1/2009 | You et al. | |
| D611,201 S | 3/2010 | Jakubowski et al. | |
| D611,202 S | 3/2010 | Jakubowski et al. | |
| D615,251 S | 5/2010 | Scherbing | |
| D617,958 S | 6/2010 | Benincasa et al. | |
| 7,802,540 B2 | 9/2010 | Jakubowski et al. | |
| 8,127,715 B2 | 3/2012 | Leung | |
| 8,127,719 B2 | 3/2012 | Jakubowski et al. | |
| 8,132,537 B2 | 3/2012 | Trunnell et al. | |
| D659,294 S | 5/2012 | Veness et al. | |
| D671,691 S | 11/2012 | Neilan | |
| 8,336,500 B1 | 12/2012 | Britt | |
| D680,696 S | 4/2013 | Hammel | |
| 8,408,416 B2 | 4/2013 | Cheng-Lung et al. | |
| 8,413,472 B2 | 4/2013 | Chiang | |
| D692,621 S | 10/2013 | Ganahl | |
| 8,544,417 B2 * | 10/2013 | Sangl | A01K 1/0245 |
| | | | 119/455 |
| D696,473 S | 12/2013 | Ganahl | |
| 8,613,260 B2 | 12/2013 | Veness et al. | |
| D703,876 S | 4/2014 | Chance et al. | |
| 8,733,292 B2 | 5/2014 | Nichols | |
| 8,757,095 B2 | 6/2014 | Farmer et al. | |
| D713,099 S | 9/2014 | Chance et al. | |
| D717,005 S | 11/2014 | Skaggs | |
| D720,503 S | 12/2014 | Lloyd | |
| 8,925,491 B2 | 1/2015 | Glover | |
| 9,095,120 B1 | 8/2015 | Skaggs | |
| 9,119,375 B2 | 9/2015 | Flannery et al. | |
| 9,173,374 B2 | 11/2015 | Hovsepian | |
| D760,447 S | 6/2016 | Edmonds | |
| 9,370,165 B2 | 6/2016 | de Bien | |
| 9,392,766 B1 | 7/2016 | Elden | |
| D768,941 S | 10/2016 | Edmonds | |
| D778,510 S | 2/2017 | Edmonds | |
| D808,596 S | 1/2018 | Veness | |
| D822,912 S | 7/2018 | Edmonds | |
| D823,544 S | 7/2018 | Nguyen | |
| D827,211 S | 8/2018 | Cronkhite | |
| D827,212 S | 8/2018 | Cronkhite | |
| D833,085 S | 11/2018 | Edmonds | |
| 2002/0113389 A1 | 8/2002 | Robinson | |
| 2004/0016409 A1 | 1/2004 | Schwinghammer et al. | |
| 2004/0026935 A1 | 2/2004 | Tang | |
| 2004/0065270 A1 | 4/2004 | King | |
| 2004/0134444 A1 | 7/2004 | Shiever et al. | |
| 2004/0194723 A1 | 10/2004 | Farmer et al. | |
| 2005/0103279 A1 | 5/2005 | Brewer et al. | |
| 2005/0241593 A1 | 11/2005 | Kaura | |
| 2005/0284399 A1 | 12/2005 | Asma | |
| 2006/0048716 A1 | 3/2006 | Garofola | |
| 2006/0169218 A1 | 8/2006 | Chang | |
| 2007/0056524 A1 | 3/2007 | Barca | |
| 2007/0157890 A1 | 7/2007 | Kaura | |
| 2007/0278755 A1 | 12/2007 | Jack | |
| 2008/0022938 A1 | 1/2008 | Callan | |
| 2008/0245313 A1 | 10/2008 | Jakubowski et al. | |
| 2009/0011210 A1 | 1/2009 | Gao et al. | |
| 2009/0101075 A1 | 4/2009 | Matlack | |
| 2009/0205578 A1 | 8/2009 | Alves | |
| 2009/0223461 A1 | 9/2009 | Trunnell et al. | |
| 2009/0288613 A1 * | 11/2009 | Ho | A01K 1/0245 |
| | | | 119/482 |
| 2010/0043720 A1 | 2/2010 | Yelverton | |
| 2010/0066041 A1 | 3/2010 | Metzger | |
| 2010/0192870 A1 | 8/2010 | Wood | |
| 2010/0282179 A1 * | 11/2010 | Ho | A01K 1/03 |
| | | | 119/455 |
| 2011/0220033 A1 | 9/2011 | Sangl et al. | |
| 2012/0037083 A1 | 2/2012 | Greene | |
| 2013/0055962 A1 | 3/2013 | Scoggins | |
| 2013/0220231 A1 | 8/2013 | Hovsepian | |

(56) References Cited

U.S. PATENT DOCUMENTS

| | | | |
|---|---|---|---|
| 2013/0233250 A1 | 9/2013 | Veness et al. | |
| 2014/0060445 A1* | 3/2014 | Wilms | A01K 1/03 119/481 |
| 2014/0083366 A1 | 3/2014 | Veness | |
| 2014/0137483 A1 | 5/2014 | Tong et al. | |
| 2014/0216356 A1 | 8/2014 | Glover et al. | |
| 2015/0034018 A1 | 2/2015 | Edmonds | |
| 2015/0125250 A1 | 5/2015 | Sindlinger | |
| 2016/0192614 A1 | 7/2016 | Hawk et al. | |
| 2016/0192615 A1 | 7/2016 | Parness | |

FOREIGN PATENT DOCUMENTS

| | | |
|---|---|---|
| FR | 2496401 | 6/1982 |
| FR | 2815817 | 5/2002 |
| FR | 2974972 | 11/2012 |
| GB | 503104 | 3/1939 |
| GB | 1260572 | 1/1972 |
| WO | 1999018317 A1 | 4/1999 |
| WO | 2015021053 A1 | 2/2015 |

OTHER PUBLICATIONS

U.S. Appl. No. 15/427,037, filed Feb. 7, 2017, assignee Edmonds Outdoors, LLC.
U.S. Appl. No. 15/291,048, filed Oct. 11, 2016, assignee Edmonds Outdoors, LLC.
U.S. Appl. No. 16/290,880, filed Mar. 2, 2019, assignee Edmonds Outdoors, LLC.
U.S. Appl. No. 16/290,885, filed Mar. 2, 2019, assignee Edmonds Outdoors, LLC.
U.S. Appl. No. 16/290,890, filed Mar. 2, 2019, assignee Edmonds Outdoors, LLC.
U.S. Appl. No. 15/011,453, filed Jan. 29, 2016, assignee Edmonds Outdoors, LLC.
"Alumni Profile: Addison Edmonds". Found on line Jun. 22, 2016 at olemissalumni.com. Page dated Mar. 1, 2015. Retrieved from http://www.olemissalumni.com/alumni-profile-addison-edmonds/.
"Dog Crate Door: How We Made it Stronger and Escape-Proof". Found on line Jun. 22, 2016 at gunnerkennels.com. Page dated Apr. 10, 2015. Retrieved from https ://www .gun nerken nels.com/blog/dog-crate-door-how-we-made-it-stronger-and-escape-proof.
"Gunnar Kennel". Found on line Jun. 22, 2016 at youtube.com. Page dated May 14, 2015. Retrieved from https://www.youtube.com/watch?v=zoM MV An hu30.
"Pet Travel Carriers and Crates-Crash Test Results". Found on line Jun. 22, 2016 at gopetfriendlyblog.com. Page dated 0713012015. Retrieved from http://www.gopetfriendlyblog.com/pet-travel-carriers-and-crates-crash-test-resu lts/.
"ArcticShield Kennel Covers." Found online Apr. 11, 2018 at www.youtube.com. Page dated Jul. 14, 2015. Retrieved from URL: https://www.youtube.com/watch?v=R3XSN-cPQSE (Year: 2015).
"Mud River Dixie Kennel Cover." Found online Apr. 11, 2018 at www.amazon.com. Page dated Dec. 13, 2014. Retrieved from URL: https://goo.gl/XBrdqZ (Year: 2014).
"Classic Accessories Insulated Dog Kennel Jacket." Found on line Apr. 11, 2018 atwww.amazon.com. Page dated 0710212010. Retrieved from URL: https://www.amazon.com/classic-accessories-insulated-kennel-realtree/dp/b000pd8cck (Year: 2010).
PCT/US2014/049800, International Search Report, dated Nov. 21, 2014, 13 pages.

\* cited by examiner

ANIMAL ENCLOSURE

CROSS-REFERENCES TO RELATED APPLICATIONS

This non-provisional U.S. Patent Application is a continuation of and claims priority to and benefit of co-pending non-provisional patent application Ser. No. 15/011,452 filed Jan. 29, 2016, which is a continuation-in-part of and claims priority to and benefit of patent application Ser. No. 29/539,652 filed Sep. 16, 2015 (now issued) and also provisional application No. 62/109,606 filed Jan. 29, 2015, and also co-pending patent application Ser. No. 14/452,010 filed Aug. 5, 2014, which is a non-provisional of provisional application No. 61/862,393 filed Aug. 5, 2013, all of which are hereby incorporated by reference in their entireties.

BACKGROUND

The present invention relates generally to structures for housing animals and more particularly to portable pet kennels and pet crates. In some embodiments, the present invention relates to portable pet crates for housing or transporting dogs.

Various types of structural enclosures for storing and transporting animals are known in the art. Conventional portable animal crates such as those used for housing and transporting dogs typically include a plastic or metal wire construction and include an interior enclosure with a selectively openable door. Conventional portable animal crates generally include a single-layer construction such as a single layer of plastic, metal or wire mesh. The single-layer material forms the structural support and also defines the enclosure space within the interior of the crate. Conventional single-layer animal crates of this type are generally sized to easily fit in the bed of a truck or the cargo area of a sport-utility vehicle, and such crates are often used by sportsmen, disabled persons, rescue, military and/or law enforcement personnel for storing and transporting dogs. Such conventional portable animal crates provide a benefit of being relatively lightweight and portable such that a single person can lift and move the crate. Additionally, these types of conventional animal crates are generally sized to accommodate only the animal or animals to be housed within, thereby enhancing the portable nature of the product.

One problem with conventional portable animal crates is the interior environment may become soiled during use. For example, many portable plastic animal crates include a bottom that is continuously molded into the side walls rising from the bottom. As such, any liquid or animal waste accumulation inside the bottom of the crate will remain in the crate. When such crates are used with wet animals or in wet conditions, water and mud has a tendency to accumulate in the bottom of the crate. This generally creates an uncomfortable environment for the animal. Moreover, the accumulation of water in the bottom of an animal crate may be harmful to animals in wet cold conditions such as those experienced by sporting dogs during winter hunting seasons. Additionally, the lack of drainage in the crate makes it difficult to wash out the interior of the crate with a spray hose.

A further problem with conventional portable animal crates includes the inability of a crate to be easily secured to a structure such as the bed of a pickup truck or the interior of a sport utility vehicle. During travel, it is often preferable to have the crate securely tied down to a rigid object. Many conventional plastic animal crates do not include external attachment points for securing webbing, rope, or other supports to the crate. Users of conventional crates often place tie-downs over the roof of the crate. However, without attachment points, the tie-down material may slip or become dislodges, especially during wet weather, or during a high-impact situation such as a vehicle accident. When a tie-down becomes loose, the crate may undesirable separate from the vehicle and further injure the animal housed within. Conventional animal crates also have a tendency to slide on surfaces when unsecured. This may further enhance the potential for damage to the crate and/or the animal inside the crate during transport.

What is needed, then, are improvements to animal enclosures to address these and other problems.

BRIEF SUMMARY

The present disclosure provides a portable animal enclosure having numerous features to address one or more of the problems noted above.

A portable animal enclosure apparatus includes a kennel body. A door opening is defined at a first end of the kennel body, and a rear wall is defined at a second end of the kennel body opposite the door opening. A door frame is disposed on the kennel body at the door opening. A door is disposed on the door frame, and the door is pivotally attached to the door frame and is moveable between a closed position and an open position. In some embodiments, the enclosure is rotational molded.

In further embodiments, the present disclosure provides a portable animal kennel apparatus including an outer wall and an opening shaped to allow the animal to enter and exit the kennel. A door is pivotally attached to the kennel body at a door hinge. In some embodiments, the kennel apparatus is rotational molded.

Another embodiment of the present disclosure provides a portable animal kennel apparatus including a first housing member including a first inner wall and a first outer wall spaced by a first wall gap, and a second housing member including a second inner wall and a second outer wall spaced by a second wall gap. The first and second housing members are securable together to form a housing for the animal. In some embodiments, the first and second housing members are both rotational molded.

In some embodiments, it is an object of the present disclosure to provide a double-walled animal enclosure for housing animals during transportation.

A further object of the present disclosure in some embodiments is to provide an animal enclosure having improved structural rigidity and stability.

Yet another object of the present disclosure in some embodiments is to provide an animal enclosure with improved thermal insulation of the enclosed space, during hot and/or cold conditions.

Another object of the present disclosure in some embodiments is to facilitate attachment of the animal enclosure to a structure using integral attachment bars.

A further object of the present disclosure in some embodiments is to prevent the enclosure from slipping across a surface during use by using non-skid feet.

Yet another object of the present disclosure in some embodiments is provide an animal enclosure with a moat and drain hole that will allow liquid accumulation to exit the interior of the enclosure.

Numerous other objects, features and advantages of the present invention will be readily apparent to those skilled in the art upon a reading of the following disclosure when taken in conjunction with the accompanying drawings.

DETAILED DESCRIPTION

Figure 1:
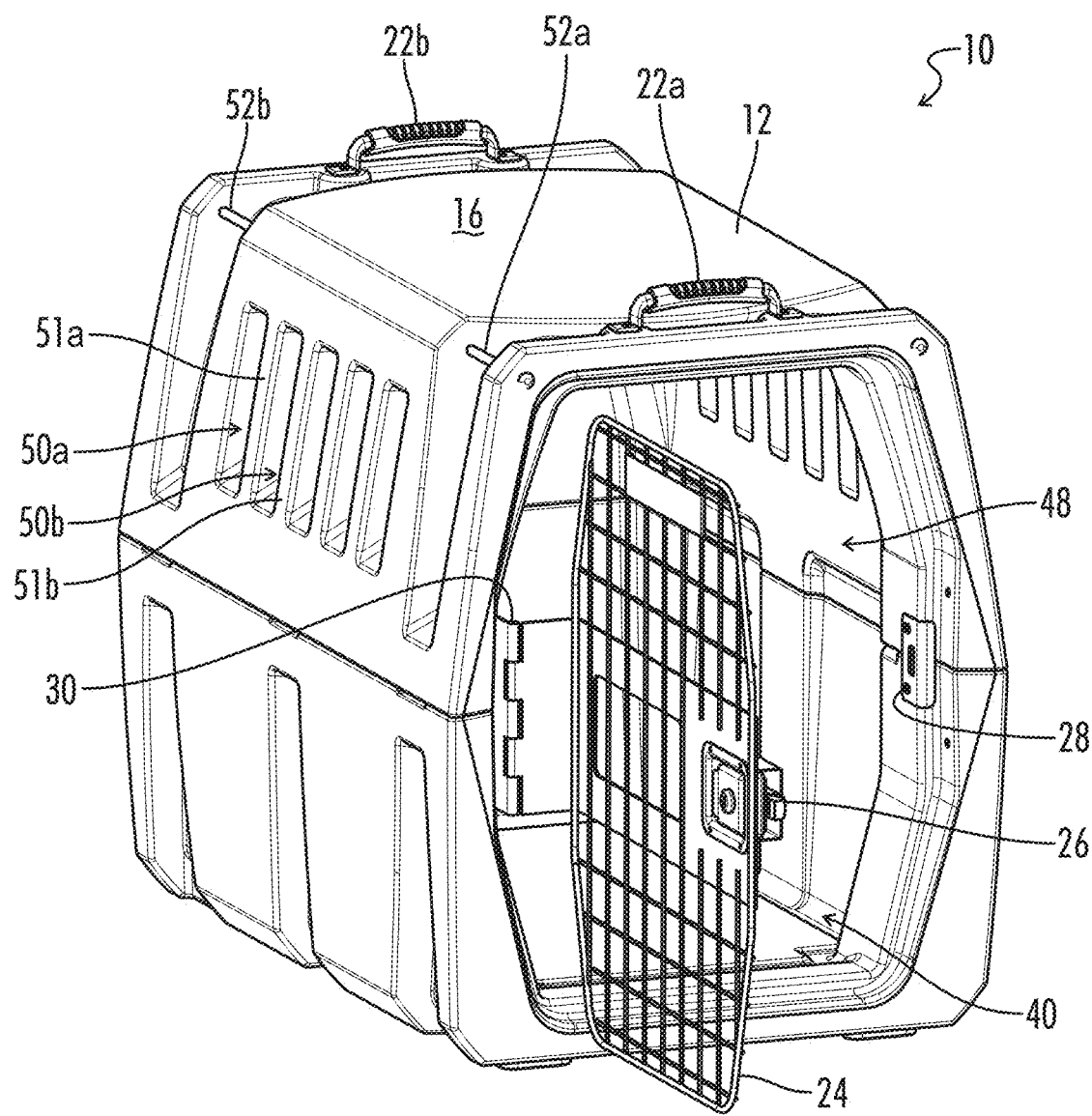
FIG. 1 illustrates a perspective view of an embodiment of an animal enclosure in accordance with the present disclosure.

Referring now to the drawings, FIG. 1 illustrates an embodiment of an animal enclosure (also referred as a kennel or crate) designated by the numeral 10. Animal crate, animal enclosure, or kennel 10, includes a housing or kennel body 12 defining an interior space shaped and sized to accommodate one or more animals. In some embodiments, kennel body 12 is shaped to accommodate a dog. Kennel 10 is also shaped and sized to be portable in some embodiments. The size and shape of kennel 10 allows kennel 10 to be easily transported from a residence or building to a vehicle or other mode of transportation. Additionally, in some embodiments, kennel 10 is portable and is shaped and sized to comply with one or more regulations for traveling with pets on commercial airlines.

Kennel 10 includes a door 24 hingedly attached to the kennel body 12. Door 24 includes a metal wire construction to allow airflow through the door into and out of the interior enclosure in some embodiments. Door 24 includes a latch 26 selectively engageable with a corresponding strike-plate 28. The strike-plate 28 is mounted on the door frame adjacent the door opening 48 to provide additional rigidity. When door 24 is fully closed, door 24 covers door opening 48. Door 24 is pivotable about a door hinge 30 located on or near kennel body 12. Door 24 may freely rotate about door hinge 30 to open or close door 24.

Kennel 10 also includes first and second handles 22a, 22b positioned on the kennel body 12. In some embodiments, first and second handles 22a, 22b are located on the kennel roof 16 at front and rear positions in some embodiments. Handles 22 may include any suitable handles, and in some embodiments include a nylon webbing material with a rubberized grip region. Handles 22 are secured to kennel body 12 using one or more handle fasteners. As such, the handles 22 may be removed and replaced in the event a handle becomes damaged or worn.

Kennel body 12 includes a two-piece construction in some embodiments. Kennel body 12 includes an upper housing member 18 and a lower housing member 20, seen in FIGS. 2-6. Each of upper and lower housing members 18, 20 may be formed independently of each other and subsequently joined together to form kennel 10. In some embodiments, upper and lower housing members 18, 20 are secured together using one or more fasteners 78a, 78b, 78c, etc. seen in FIG. 6. Each fastener extends between upper and lower housing members 18, 20 to provide a connection between the members. In some embodiments, lower housing member 20 includes a plurality of fastener holes 58 to allow passage of fasteners 78. A corresponding socket or other fastener receiver may be located at a corresponding location on upper housing member 18. In some embodiments, threaded sockets 74 are molded into upper housing member 18 to receive a threaded end of a fastener 78 inserted upwardly toward upper housing member 18. In alternative embodiments, threaded sockets are installed in lower housing member to receive fasteners installed through corresponding fastener holes defined in the upper housing member 18.

Kennel 10 may be provided fully assembled using fasteners 78, or may be sold with upper and lower housing members 18, 20 separated to reduce packaging size. Kennel 10 is configured in some embodiments such that a user may construct or disassemble the upper and lower housing members 18, 20 together simply by stacking the members and installing or removing fasteners 78. To ease the assembly procedure, in some embodiments, lower housing member 20 includes one or more pilot protrusions 66a, 66b, 66c extending upwardly toward upper housing member 18. Each pilot protrusion 66 is shaped to fit in a corresponding pilot recess 68a, 68b, 68c defined in a corresponding lower edge of upper housing member 18. In some embodiments, each pilot protrusion 66 and pilot recess 68 is formed surrounding a fastener hole 58. This arrangement allows upper and lower housing members 18, 20 to be biased to an aligned position when stacked such that it becomes easier to install fasteners 78.

Figure 12A:
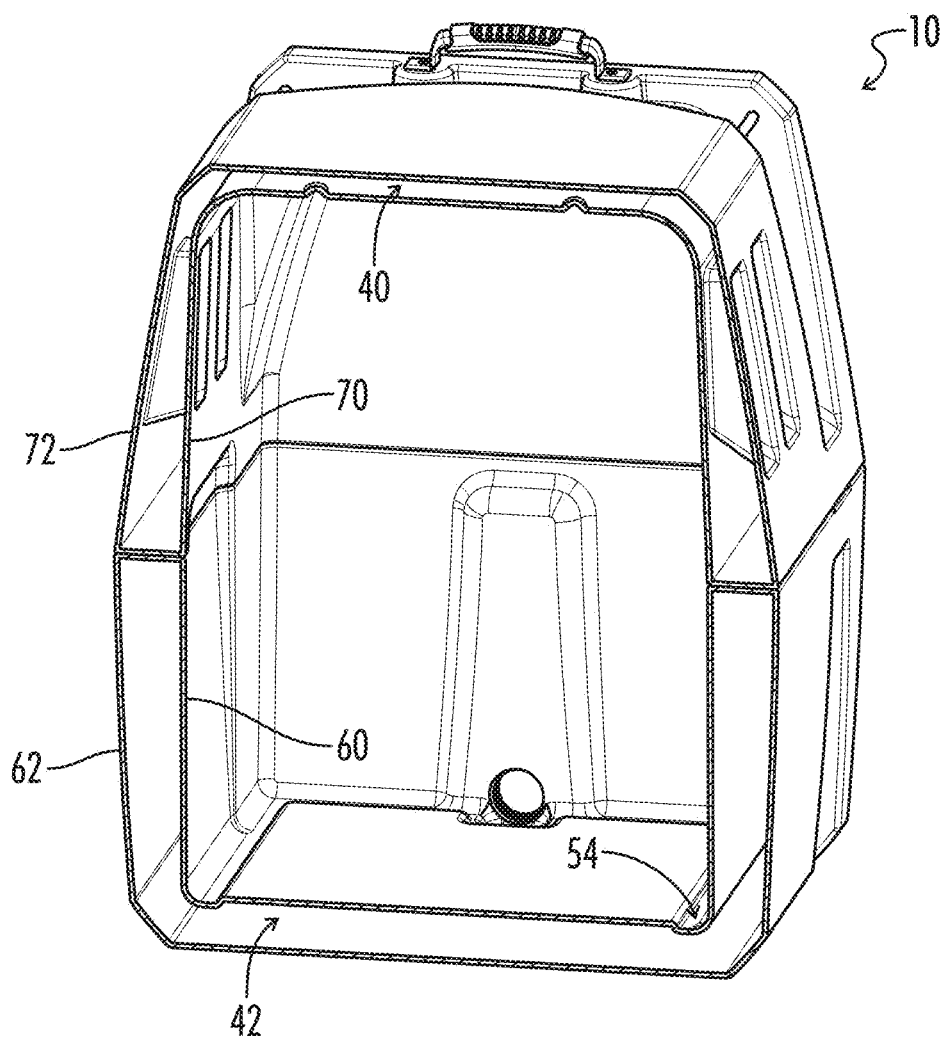
FIG. 12A illustrates a partial cross-sectional view of Section 12A-12A from FIG. 11.

Kennel 10 includes a double-walled construction in some embodiments. As such, kennel 10 includes an inner wall and an outer wall. The inner and outer walls are separated by a gap, and a space is provided between the inner and outer walls, as seen in FIG. 12A. An upper gap 40 shown in FIG. 12A is defined between inner and outer walls on upper housing member 18, and a lower gap 42 is defined between inner and outer walls on lower housing member 20. A plurality of integrated support standoffs, or kiss-offs, may be positioned in the gap to provide local structural support between opposing walls. Each support standoff may extend from an outer wall to an inner wall, or vice versa, to provide a local structural reinforcement. Each standoff at its maximum depth may contact the opposing wall. In some embodiments, each standoff at its maximum depth engages and is molded to the opposing wall. In some embodiments, the gap between inner and outer walls is filled with air. As such, kennel 10 in some embodiments includes a region of air space between inner and outer walls. The region of air space may provide enhanced insulation for the kennel without adding significant weight. This is advantageous in many applications, as the air insulation layer may provide improved thermal performance in both hot and cold conditions. Additionally, the double-walled construction including inner and outer walls separated by a gap provides greater strength and resistance to impact as compared to conventional single-walled animal crates. Referring further to FIG. 12A, in some embodiments, upper housing member 18 includes an upper inner wall 70 and an upper outer wall 72. Upper inner and outer walls 70, 72 may be continuously formed from a plastic or polymer material in some embodiments. Similarly, lower housing member 20 includes a lower inner wall 60 and a lower outer wall 62. Lower inner and outer walls 60, 62 may also be continuously formed from a plastic or polymer material in some embodiments.

Figure 12B:
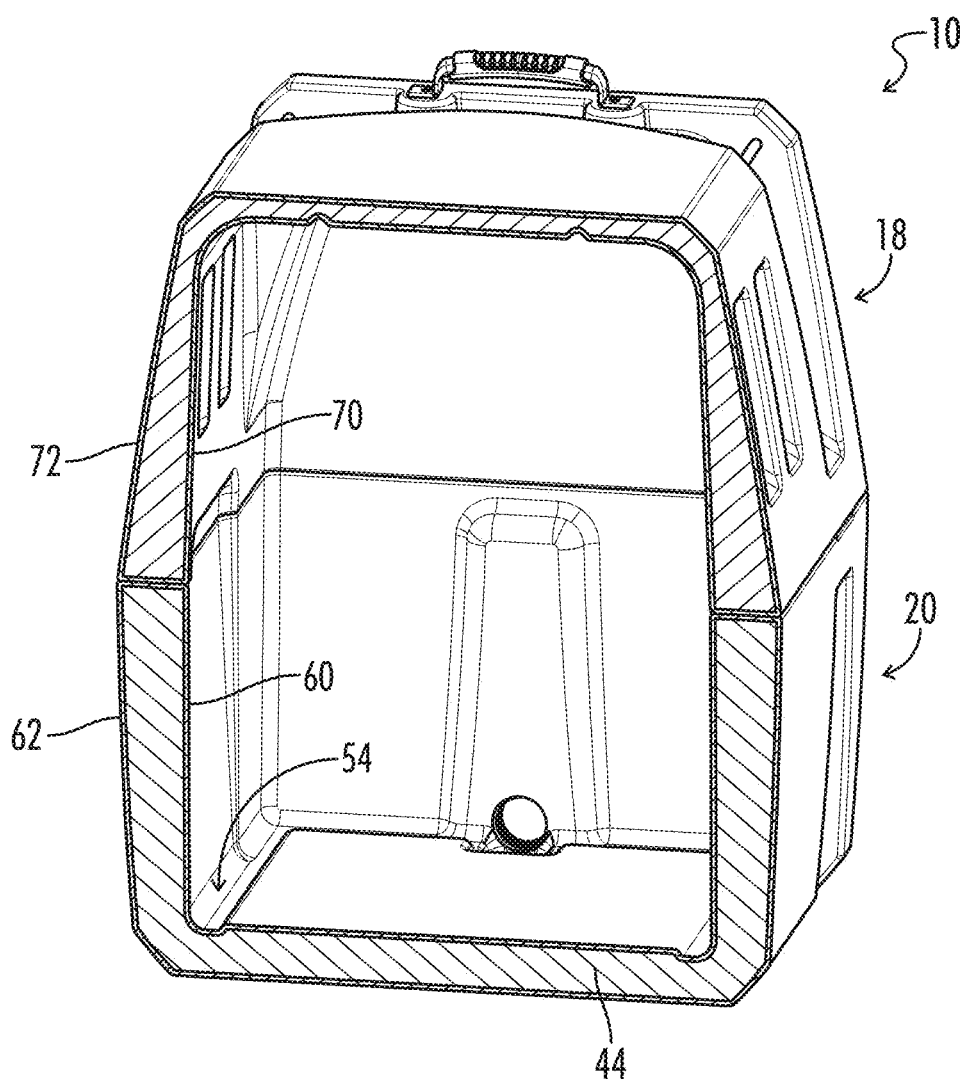
FIG. 12B illustrates a partial cross-sectional view of Section 12B-12B from FIG. 11 in an alternative embodiment.
Figure 13A:
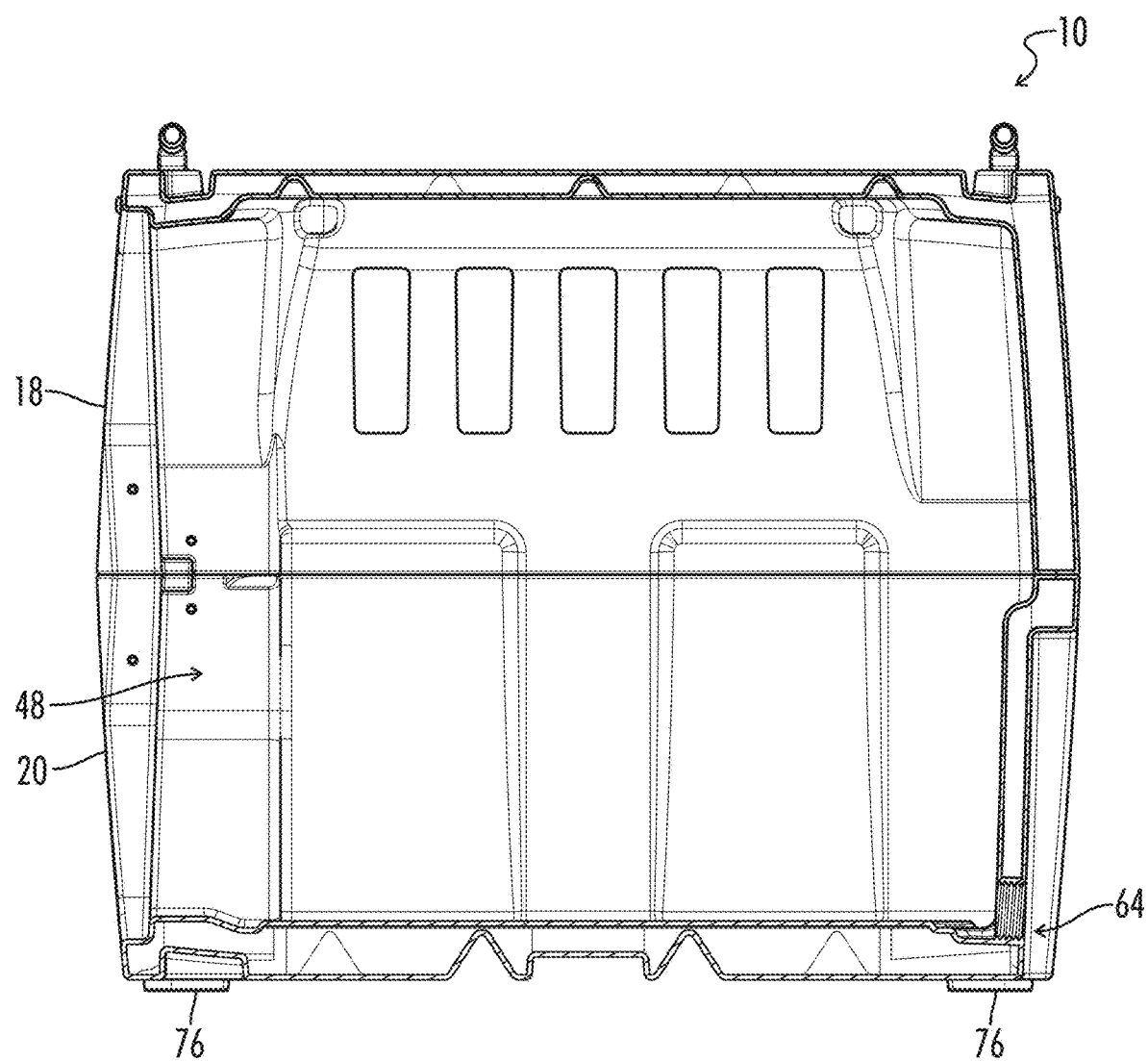
FIG. 13A illustrates a partial cross-sectional view of Section 13A-13A from FIG. 9 in an alternative embodiment.
Figure 13B:
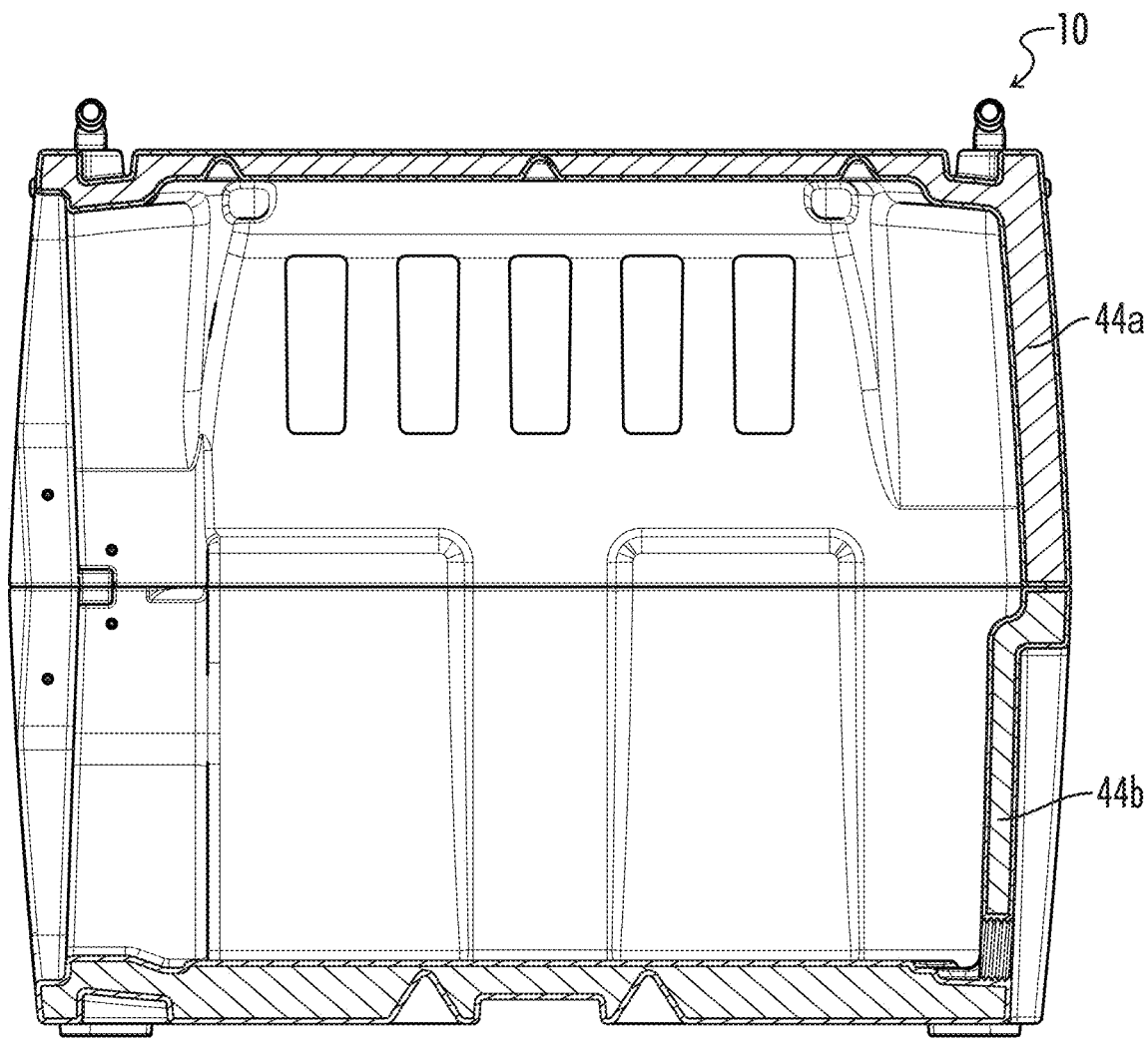
FIG. 13B illustrates a partial cross-sectional view of Section 13B-13B from FIG. 9 in an alternative embodiment.

As seen in FIG. 12B, in some embodiments, the gap between inner and outer walls is filled with a filler material. The filler material 44 may include a foam or expanded foam material in some embodiments. Alternatively, filler material 44 may include a fiber, resin, polymer, or any other suitable filler material. Filler material 44 spans the gap between inner and outer walls on upper and/or lower housing members 18, 20. Filler material 44 provides additional strength to kennel body 12. Filler material 44 also provides additional thermal insulation for keeping the interior of kennel 10 cool or warm. In some embodiments, upper housing member 18 includes a first filler material 44a, and lower housing member 20 includes a second dissimilar material 44b. In other embodiments, first and second filler materials 44a, 44b are substantially the same. In some embodiments, only one of upper and lower housing members includes a filler material.

Although the double-walled construction of kennel body 12 may be formed using any suitable process, in some embodiments, kennel body 12 includes a double-walled construction formed using a rotational molding manufacturing process, sometimes referred to as roto-molding. In such embodiments, upper housing member 18 is formed independently of lower housing member 20. In separate molds. In alternative embodiments, kennel body 12 includes a single rotational molded unitary construction having inner and outer walls, and kennel 10 is not split into upper and lower housing members. In some embodiments, the inner and outer walls are continuously formed in a molding process and are joined continuously around the edges. This provides a unitary molded object with a double-walled construction for each component of kennel body 12. The continuous one-piece construction having inner and outer walls increases strength for the kennel 10 and improves thermal performance.

Figure 14:
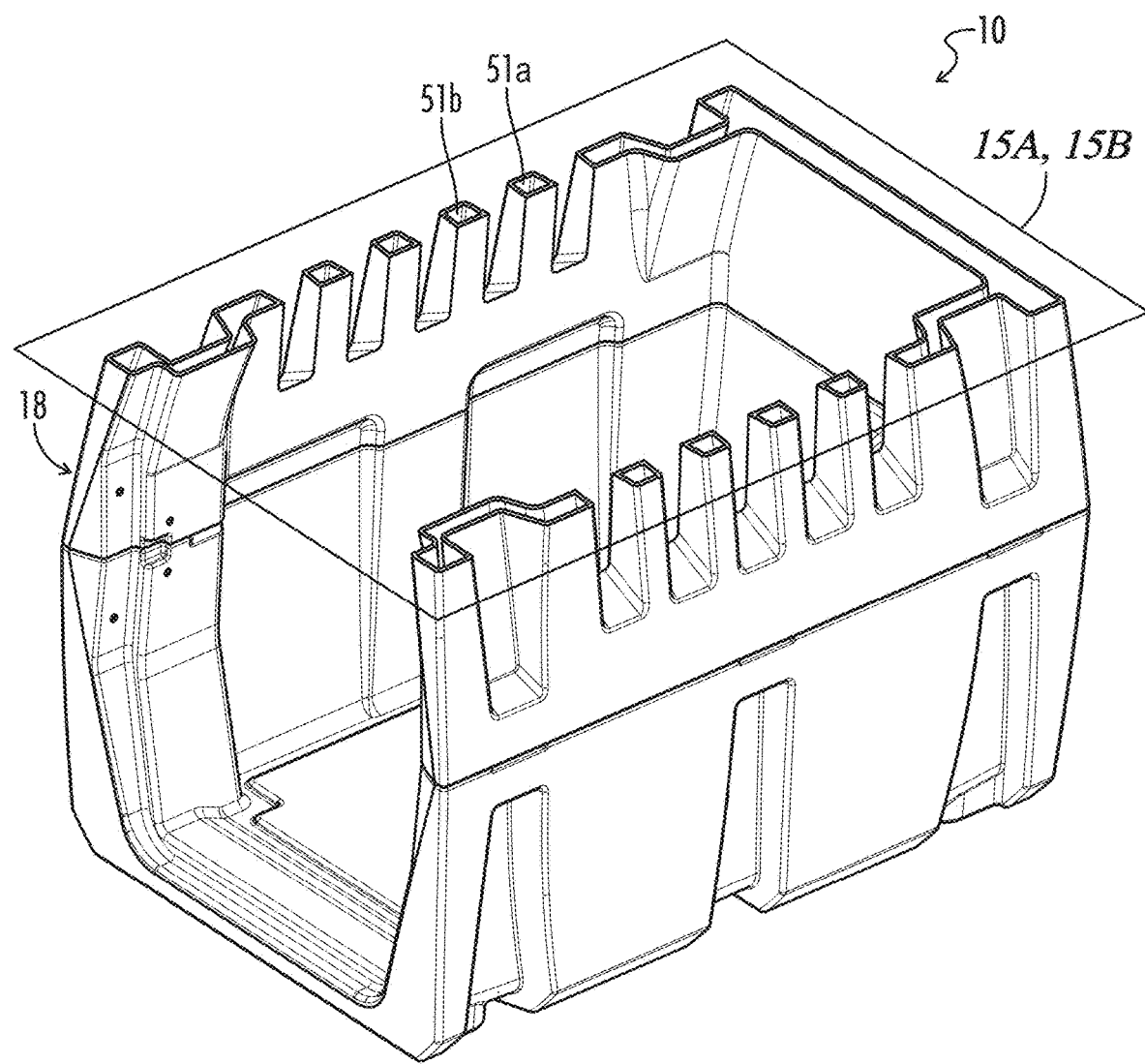
FIG. 14 illustrates a perspective view of an embodiment of an animal enclosure having a cross-sectional plane of reference.

Kennel 10 also includes a plurality of vent holes, or windows 50a, 50b, etc. Each vent hole provides an opening in a side of the kennel to allow air to flow into or to leave the enclosed space within the interior of the kennel. Each vent hole 50 is bordered by upright vent supports 51a, 51b, etc. Vent holes 50 and corresponding vent supports 51 may be located in upper housing member 18 only, in lower housing member 20 only, or on both upper and lower housing members 18, 20. Each vent support 51 provides increased structural rigidity and strength to the kennel 10. For example, a double-walled region may typically include only two layers with a space or filler material in between. However, vent supports 51 provide two extra local transverse walls facing adjacent vents, further increasing strength. As seen in a cross-sectional view in FIG. 15A taken along the plane 15A from FIG. 14, an embodiment of a vent support 51a includes an outer support wall 53a, an inner support wall 53b, a first side support wall 53c facing first vent hole 50a, and a second side support wall 53d opposite first side support wall and facing second vent hole 50b. The addition of first and second side support walls 53c, 53d provides transverse walls that provide additional strength to the kennel 10. The supports 51 also provide reinforcement in the area around a pet's head when located on upper housing member 18, as seen in FIG. 18A.

Figure 11:
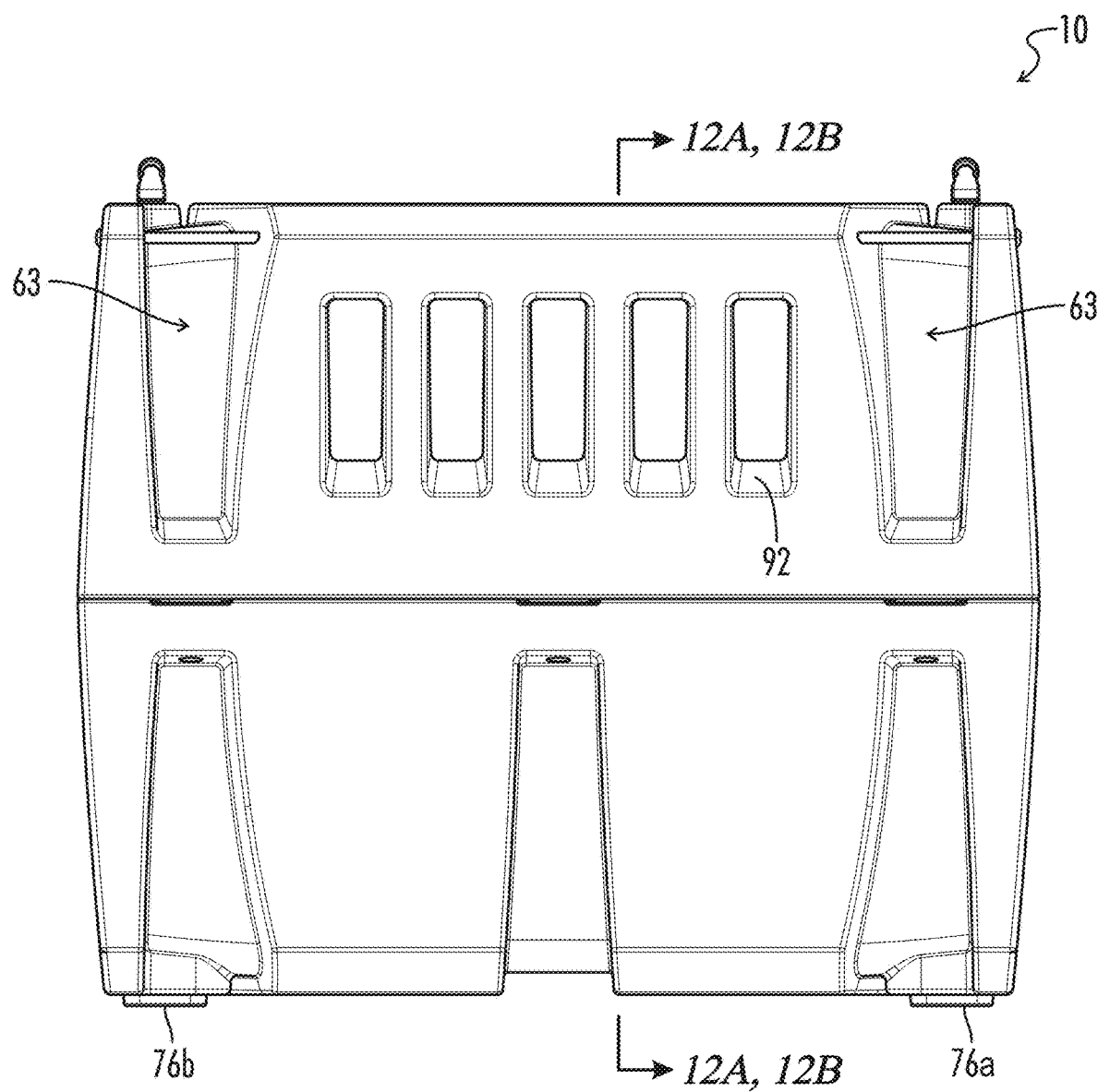
FIG. 11 illustrates a side elevation view of an embodiment of an animal enclosure in accordance with the present disclosure.
Figure 15A:
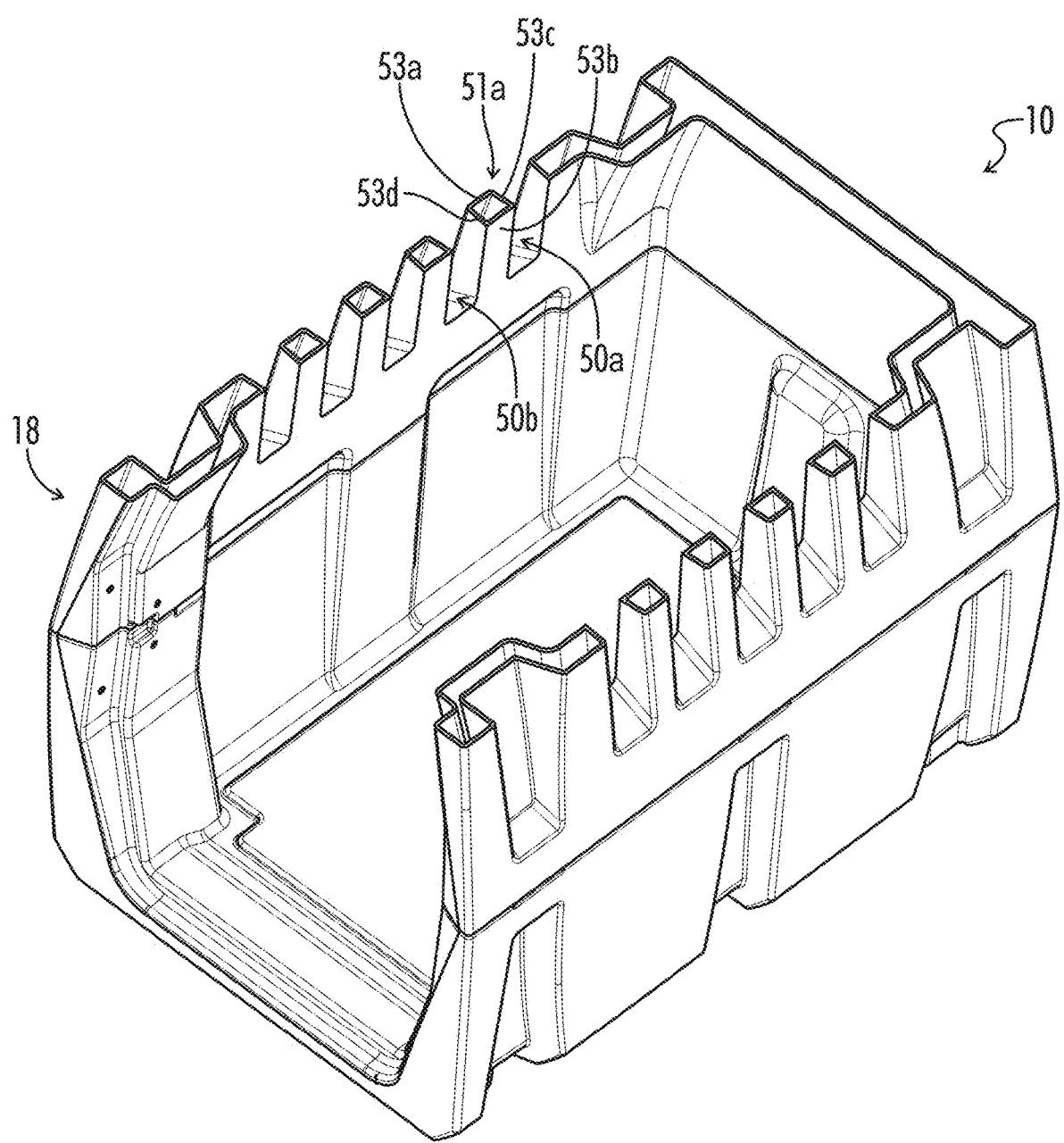
FIG. 15A illustrates a partial cross-sectional perspective view of an embodiment of an animal enclosure with an air gap between inner and outer walls.
Figure 15B:
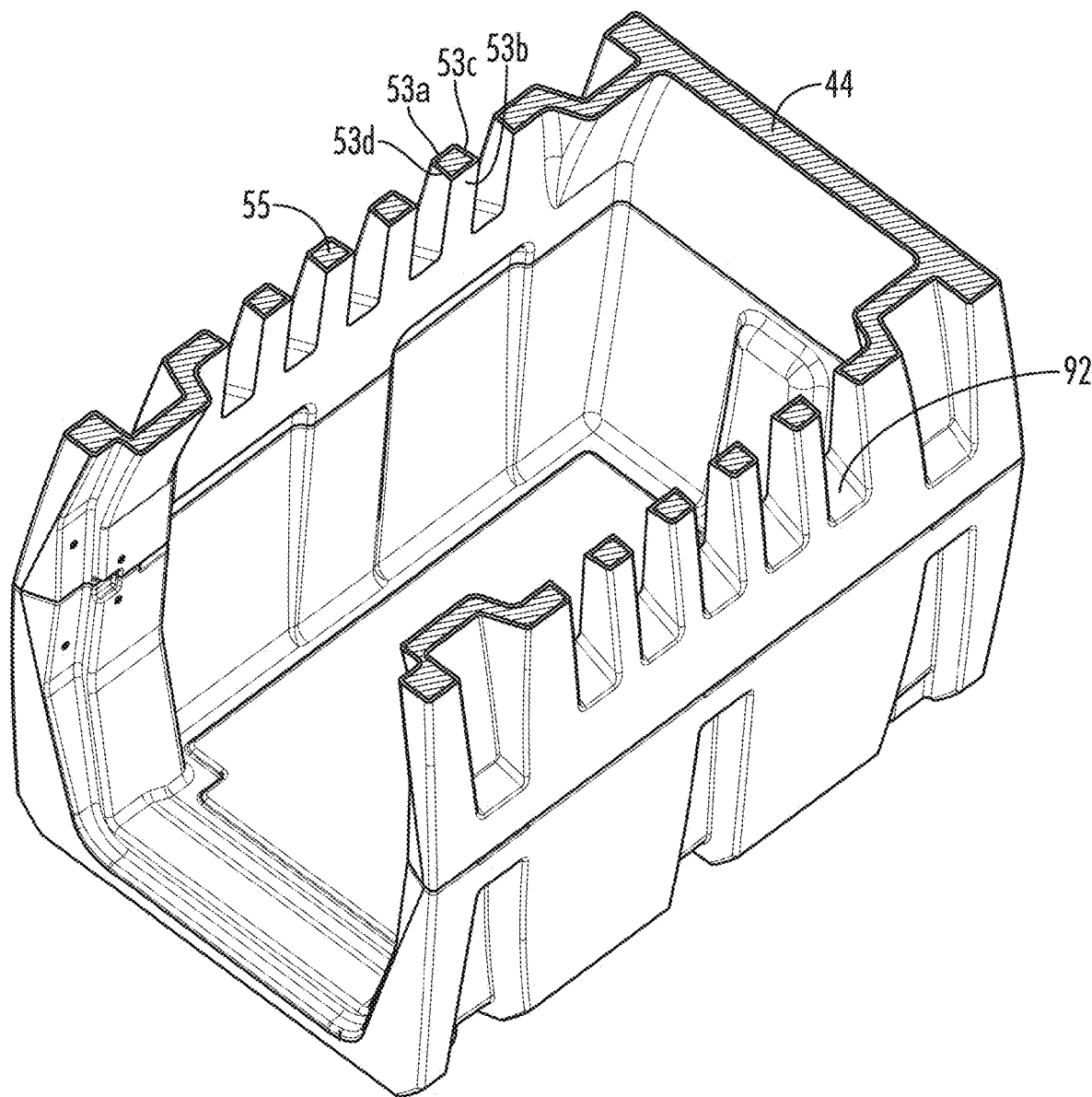
FIG. 15B illustrates a partial cross-sectional perspective view of an embodiment of an animal enclosure having a filler material between inner and outer walls.

As seen in FIG. 11 and FIG. 15B, an inclined vent ramp 92 is defined at the lower end of each vent hole 50 in some embodiments. Each vent ramp 92 includes a sloped surface, sloping downwardly from the local inner wall to the outer wall. The vent ramp 92 having a surface that slopes downwardly from the inner wall toward the outer wall allows rain or other moisture incident on the region between vent supports to drain outwardly away from the interior of the kennel 10. This helps to keep the interior of the kennel dry when transported or used in wet conditions.

As seen in FIG. 15A, each support 51 may include a hollow interior region filled with air. In other embodiments, as seen in FIG. 15B, each upright support includes a filler material 44 that is dispersed throughout the region between inner and outer walls on kennel body 12. Although upright supports 51 are shown in a vertical orientation in the figures, the supports 51 may include other angled or curved upright orientations in other embodiments.

Figure 3:
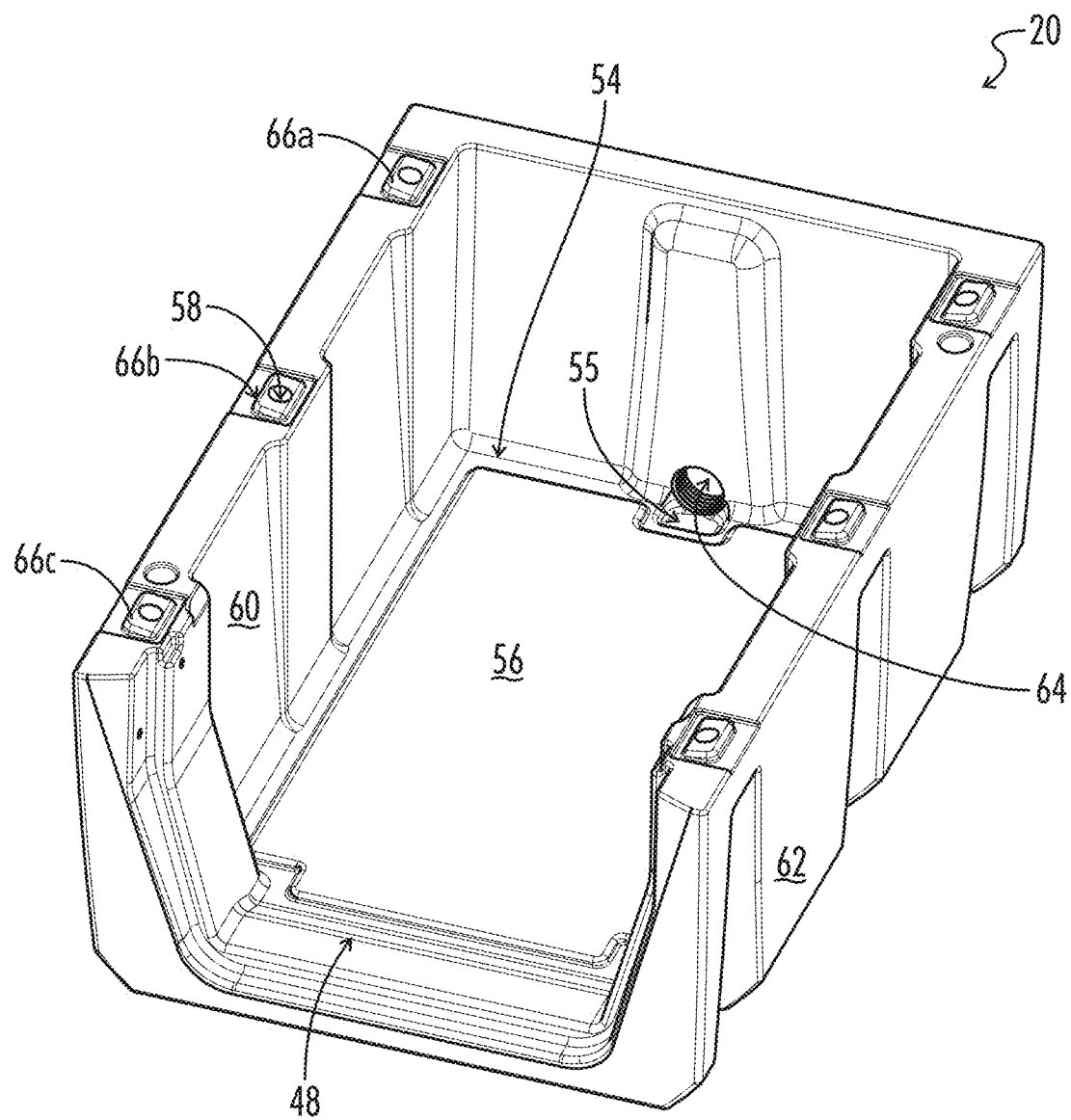
FIG. 3 illustrates a perspective view of an embodiment of a lower housing member for an animal enclosure in accordance with the present disclosure.
Figure 4:
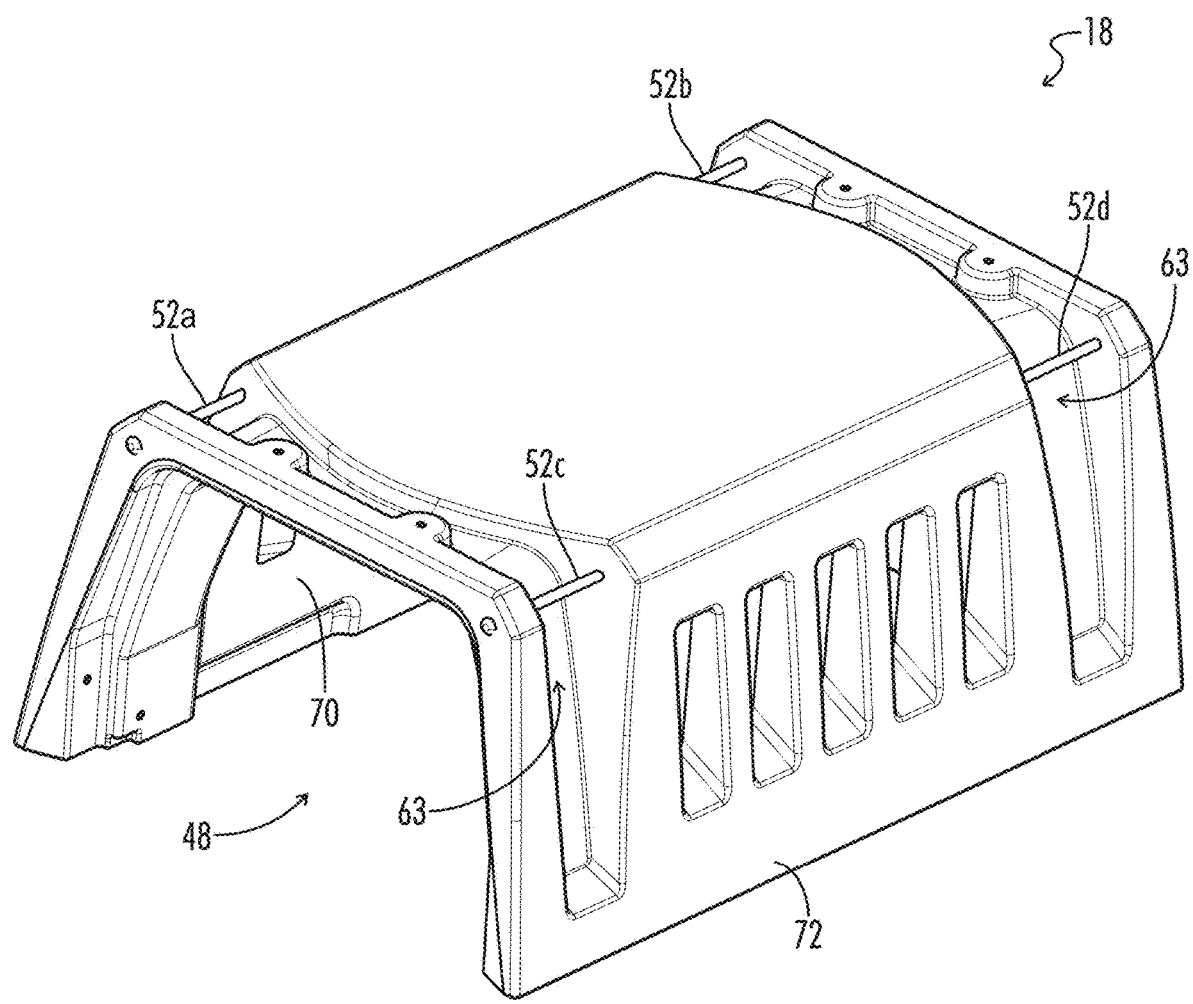
FIG. 4 illustrates a perspective view of an embodiment of an upper housing member for an animal enclosure in accordance with the present disclosure.

Referring further to FIG. 3 and FIG. 12A, in some applications, a moat 54 is defined around the perimeter of floor 56 on the interior of kennel body 12, and particularly on lower housing member 20. Moat 54 provides a recessed region for draining water off of floor 56. Moat 54 includes a slightly lower elevation than the floor 56. In some embodiments, moat 54 includes a depth greater than about ½ inch. In other embodiments, moat 54 includes a depth of between about ½ inch and about two inches. As such, liquid inside the enclosure may accumulate in moat 54 while floor 56 stays relatively dry.

Figure 10:
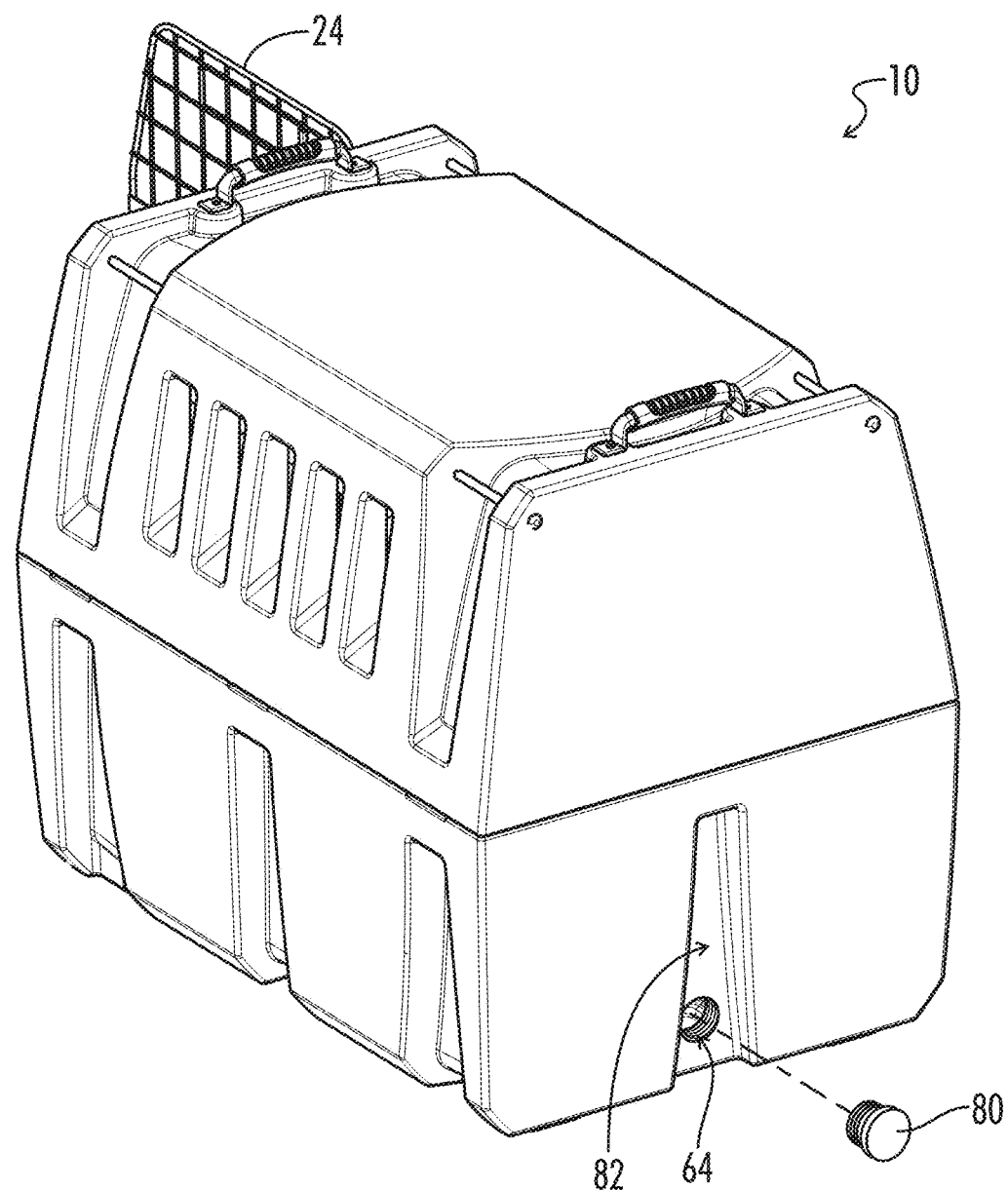
FIG. 10 illustrates a rear perspective view of an embodiment of an animal enclosure in accordance with the present disclosure.

Additionally, in some embodiments, a drain hole 64 is defined in one or more walls of kennel body 12. In some embodiments, drain hole 64 is defined in lower housing member 20 in or near the rear wall 88. Drain hole 64 allows liquid to exit the kennel 10. A removable drain plug 80, seen in FIG. 10, is installed in drain hole 64. Drain plug 80 may be removed to allow liquid to exit kennel 10. An additional drain recess 55 is defined in moat 54 adjacent drain hole 64 in the floor of lower housing member 20 in some embodiments. The drain recess 55 allows liquid to more easily escape through drain hole 64. As seen in FIG. 10, in some embodiments a plug recess 82 is formed in the outer wall of lower housing member 20 adjacent drain hole and drain plug 80. Plug recess 82 is integrally formed to provide additional structural integrity and also to recess drain plug 80 so that it does not protrude beyond the rear outer profile of kennel housing 12. During use, drain plug 80 may be removed so that the kennel 10 will drain water from a wet animal to the exterior of the kennel 10.

Figure 7:
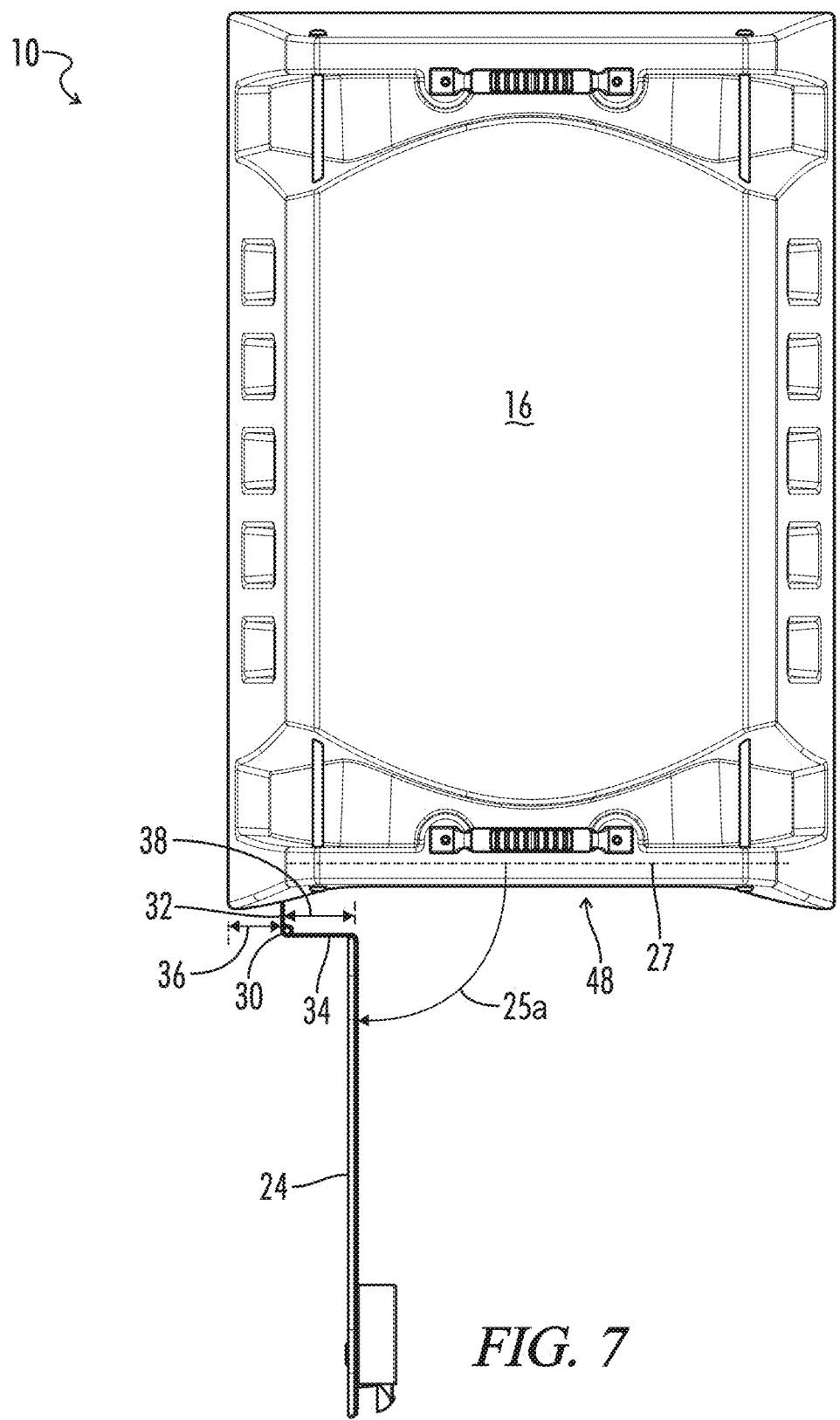
FIG. 7 illustrates a top view of an embodiment of an animal enclosure with a door open about ninety degrees from a closed position.
Figure 8:
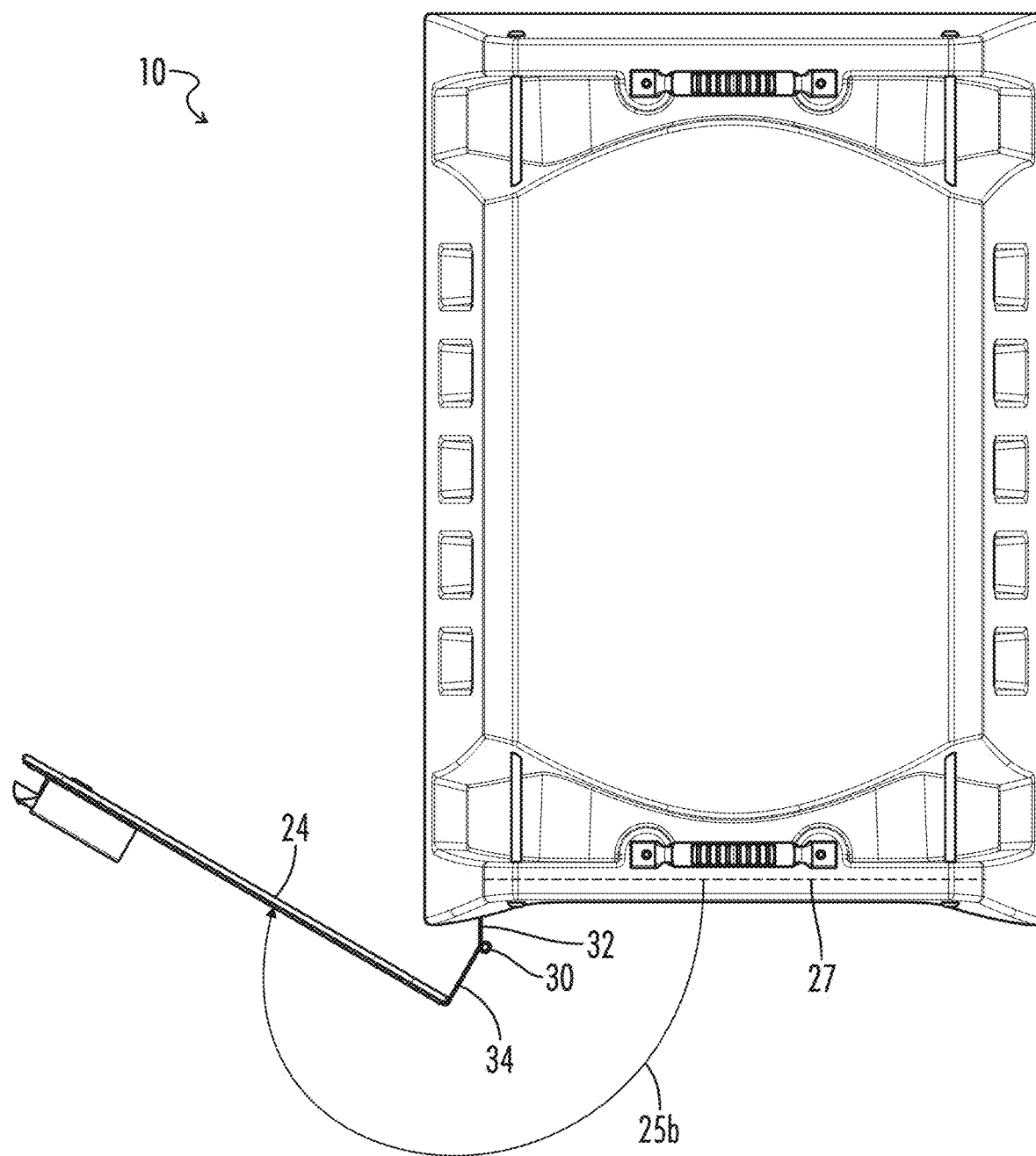
FIG. 8 illustrates a top view of an embodiment of an animal enclosure with a door open greater than about 180 degrees from a closed position.
Figure 9:
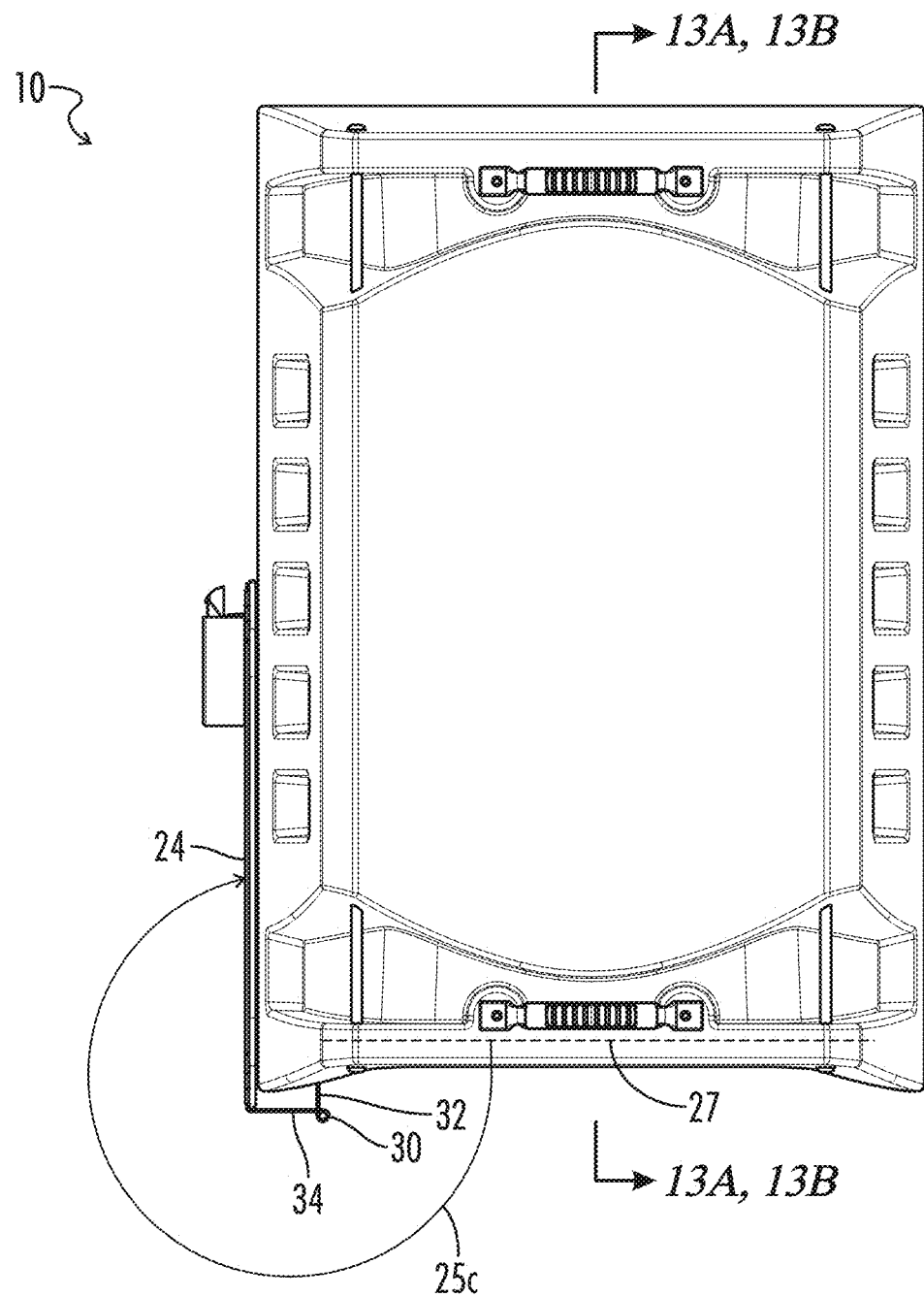
FIG. 9 illustrates a top view of an embodiment of an animal enclosure with a door open about 270 degrees from a closed position.

Referring further to FIG. 1 and FIGS. 7-9, kennel 10 in some embodiments includes a door 24 that is moveable from a fully closed position to a fully open position. In the closed position, indicated by line 27 in FIG. 7, door 24 covers door opening 48. Door 24 may be opened about door hinge 30 away from the door opening. Door 34 includes an L-shaped door bracket 34 in some embodiments. Door bracket 34 is secured at one end to door 24 and at the other end to door hinge 30. As such, door bracket 34 provides an angled extension protruding from a vertical edge of door 24. In some embodiments, door bracket 34 is substantially ninety degrees. In other embodiments, door bracket 34 includes any other suitable angle. Referring to FIG. 7, door 24 may be opened to a first angle 25a of ninety degrees or greater. Referring to FIG. 8, door 24 may be further opened to a second angle 25b greater than 180 degrees from the fully closed position indicated by line 27.

A kennel bracket 32 protrudes from kennel body 12 in some embodiments, and door hinge 30 is positioned on the distal end of kennel bracket 32. Door hinge 30 is offset from the nearest outer side wall of kennel body 12 by a door hinge offset distance, or first offset distance 36, seen in FIG. 7. First offset distance 36 is generally the normal distance between the door hinge and the local outermost side wall surface. Similarly, door hinge 30 is offset from the plane of door 24 by a door bracket offset distance 38, or second offset distance, seen in FIG. 7. In some embodiments, door bracket offset distance 38 is equal to or greater than door hinge offset distance 36. This allows door 24 to be rotated to a third angle 25c shown in FIG. 9 about 270 degrees away from the closed position to a location alongside the outer wall of kennel body 12. In this configuration, door 24 may be opened and swung around to the side of kennel body 12 in a compact position. This allows kennel 10 to remain open without having door 24 extending outwardly from kennel body 12 and taking up too much space.

Figure 2:
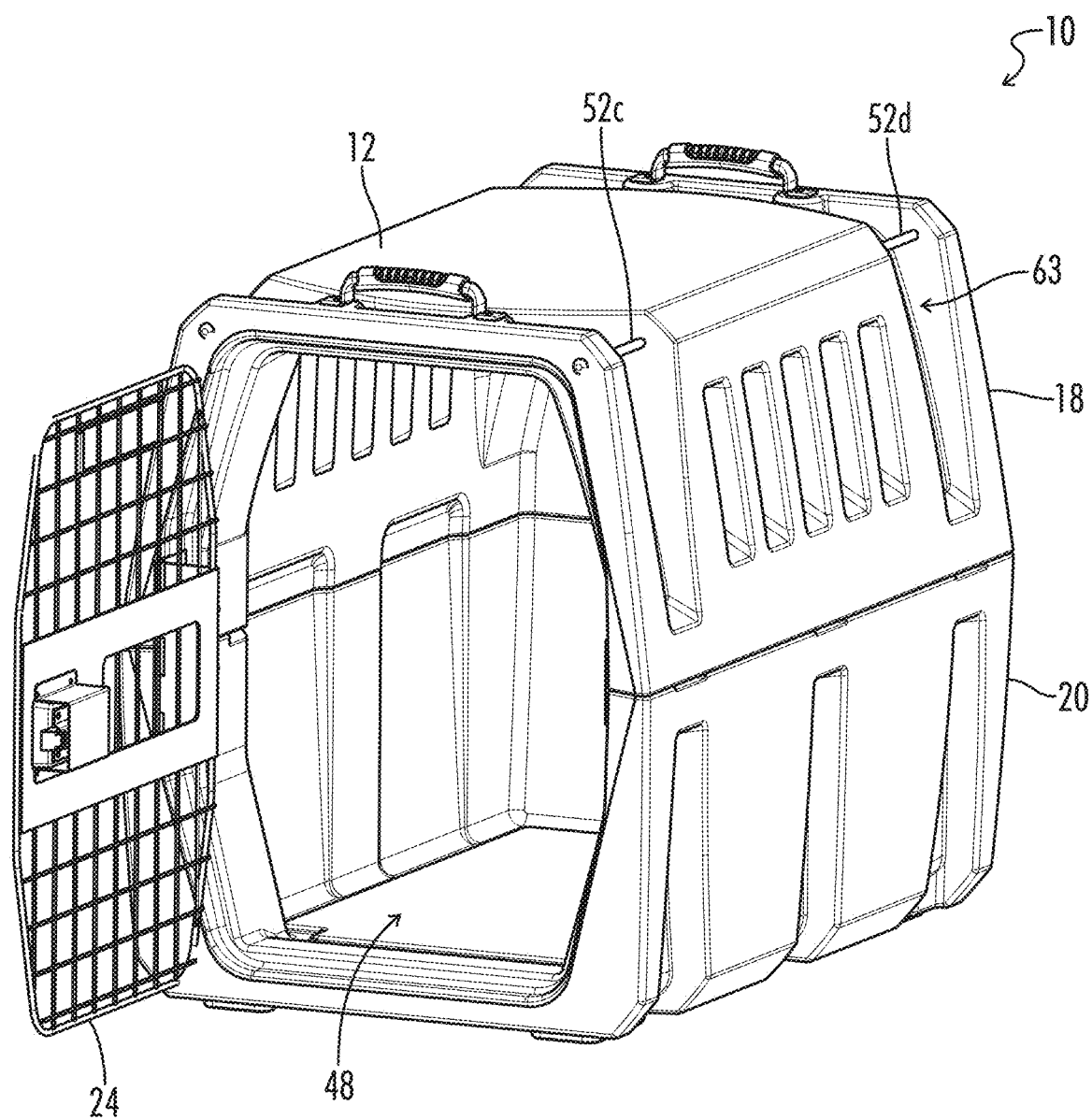
FIG. 2 illustrates a perspective view of an embodiment of an animal enclosure in accordance with the present disclosure.

Referring further to FIG. 1 and FIG. 2, in some embodiments, kennel 10 includes numerous integrated attachment bars located near the upper corners of kennel body 12. First and second attachment bars 52a, 52b are located along a first edge of kennel body 12, and third and fourth attachment bars 52c, 52d are located along a second edge of kennel body 12. Each attachment bar is located in a corresponding attachment recess 63 integrally formed in the outer wall of kennel body 12. Each attachment bar 52 is mounted in a socket such that the bar spans its associated attachment recess 63. As such, the attachment bars are flushly mounted along the outer profile of the kennel body and do not undesirably extend outwardly from the kennel body where they could become broken or damaged. Additionally, the corresponding attachment recess 63 surrounding each attachment bar 52 provides clearance space for passage of one or more tie-downs, webbing, strap, rope or chains for securing kennel 10 to a structure such as a truck bed. Each attachment bar 52 also allows kennel 10 to be locked securely to a structure to prevent theft of kennel 10 in some embodiments. In some embodiments, first and second attachment bars 52a, 52b are separate metal bars each installed in its own socket. In other embodiments, first and second attachment bars 52a, 52b form one continuously metal bar inserted through the entire length of kennel body 12.

Figure 5:
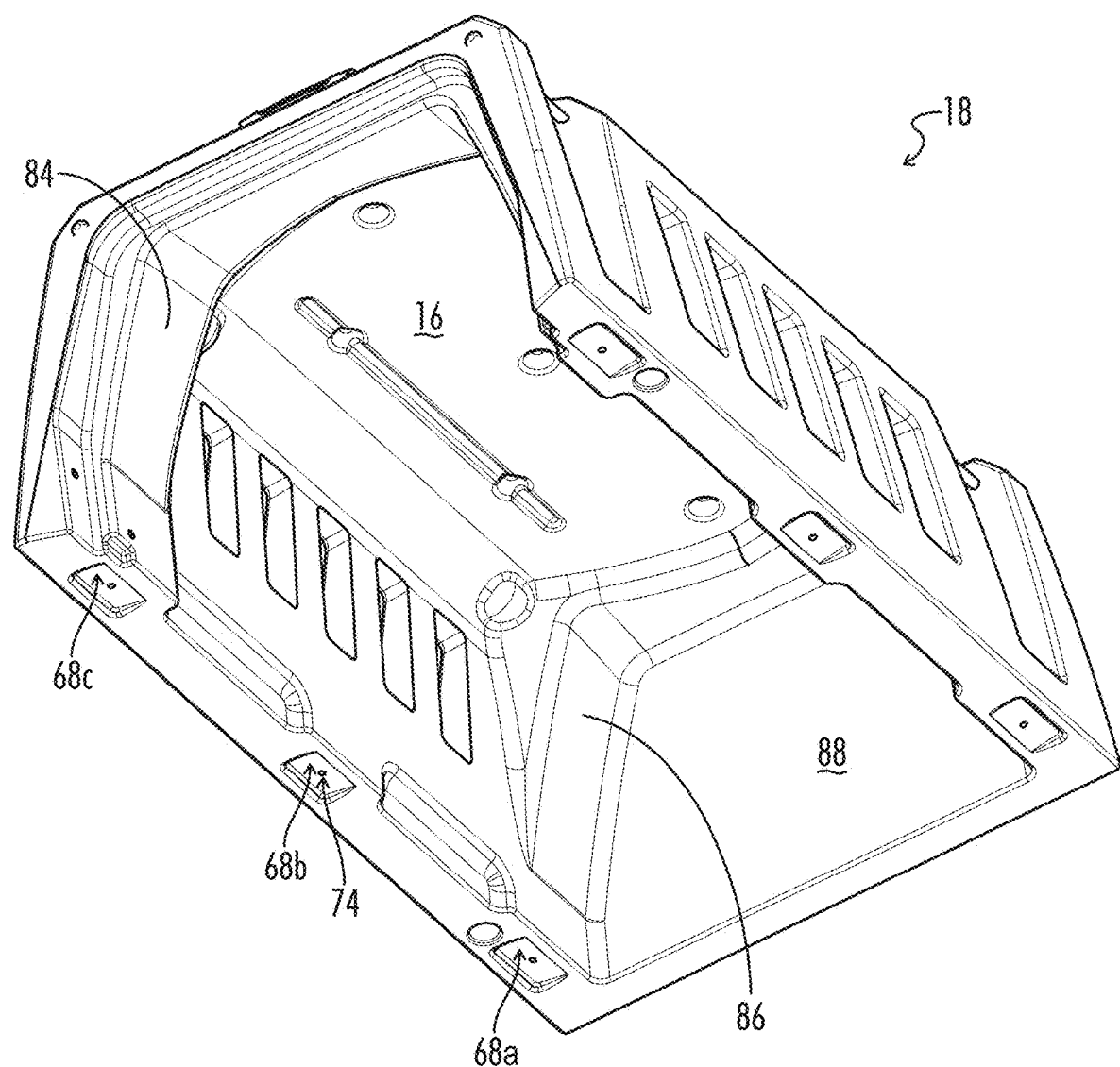
FIG. 5 illustrates a perspective view of an embodiment of an upper housing member for an animal enclosure in accordance with the present disclosure.

Referring further to FIG. 5, in some embodiments kennel 10 includes integrated truss members 84, 86. A first integrated truss member 84 is formed along the roof and upper side walls of upper housing member 18. First integrated truss member 84 includes an integrally molded support region extending farther downwardly into the enclosure than the surrounding inner wall regions, forming an integrated truss. First integrated truss member 84 is located adjacent door opening 48 in some embodiments. Similarly, a second integrated truss member 86 is formed along the inner wall of upper housing member 18 in some embodiments near the rear of the kennel. Second integrated truss member 86 may be formed adjacent rear wall 88 in some embodiments. First and second integrated truss members 84, 86 provide additional structural rigidity to upper housing member 18 and particularly to roof 16. This provides additional strength when kennel 10 is loaded externally from above or from the sides.

Figure 6:
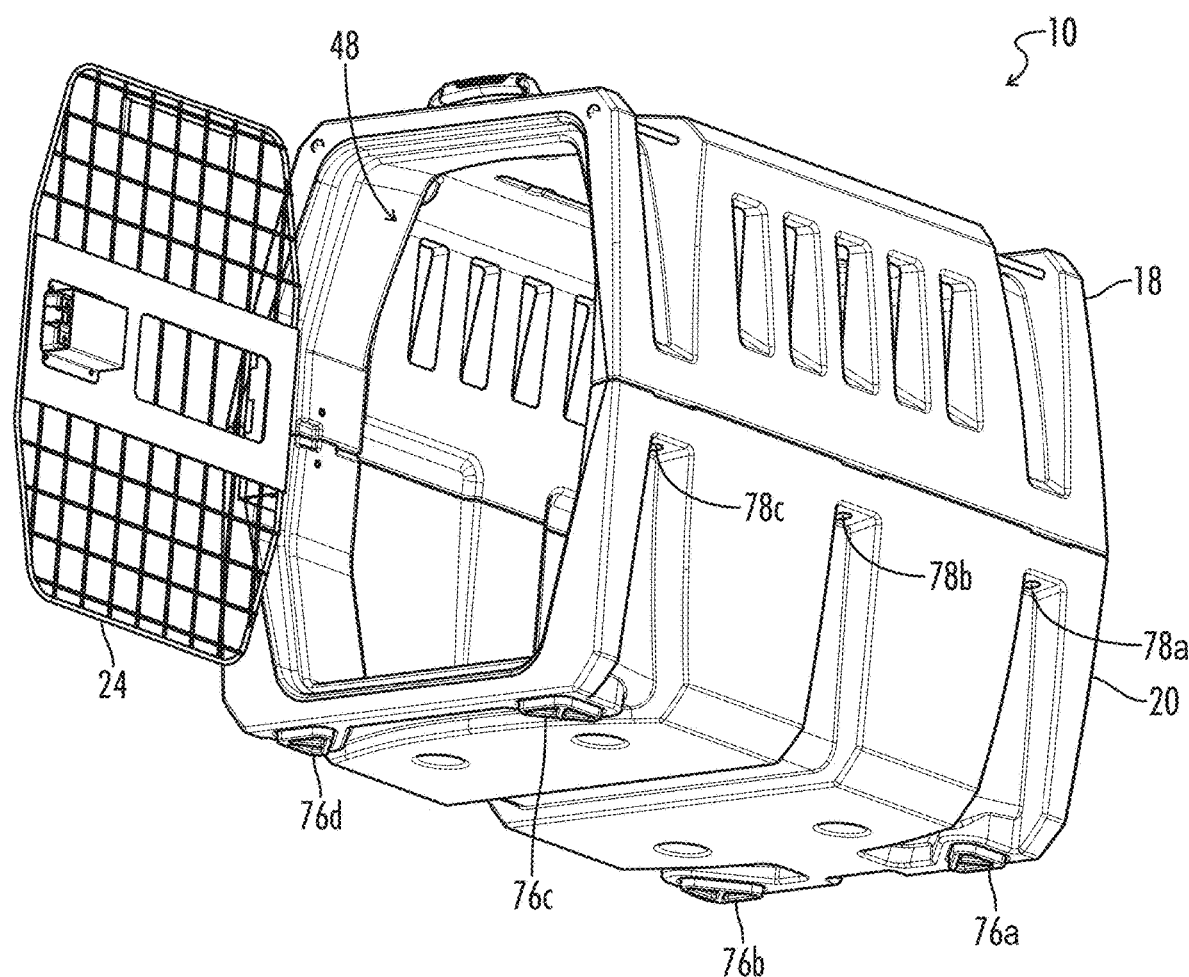
FIG. 6 illustrates a perspective view of an embodiment of an animal enclosure in accordance with the present disclosure.

Referring now to FIGS. 6 and 11, in some embodiments, kennel 10 includes one or more non-skid feet 76 disposed along the bottom of kennel body 12. Each foot 76 includes a not-skid material such as a rubber, polymer, urethane, etc. Each foot 76 protrudes downwardly from the lower outer wall on lower housing member 20. Each foot 76 may be integrally molded into the lower housing member 20 during a casting or molding procedure. Alternatively, each foot 76 forms a separate component that is installed on lower housing member 20 after molding. Each foot 76 prevents kennel 10 from inadvertently sliding on a surface during use or during transport. Additionally, feet 76 may reduce or dampen vibrations felt by the animal housed within kennel 10.

Figure 16:
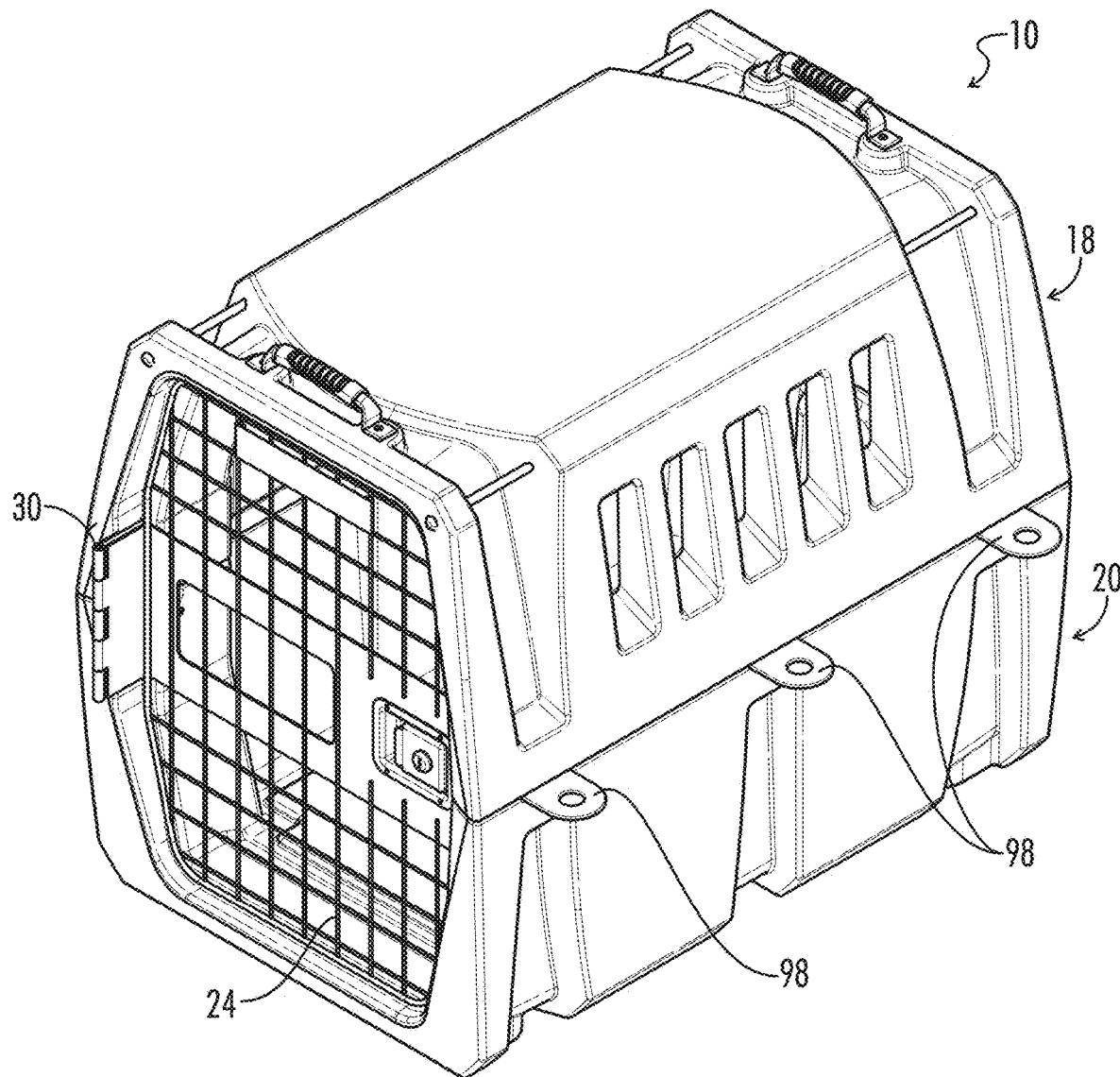
FIG. 16 illustrates a perspective view of an embodiment of an animal enclosure in accordance with the present disclosure.

Referring to FIG. 16, one or more lock flanges 98 extend from kennel body 10 in some embodiments. Each lock flange 98 includes a flange including a hole or recess for attaching a lock, cable, tie-down or other securement device. Each lock flange 98 includes a structure that may be sandwiched or clamped between upper and lower housing members. Each lock flange may be removed when not in use by disassembling upper and lower housing members.

Figure 17:
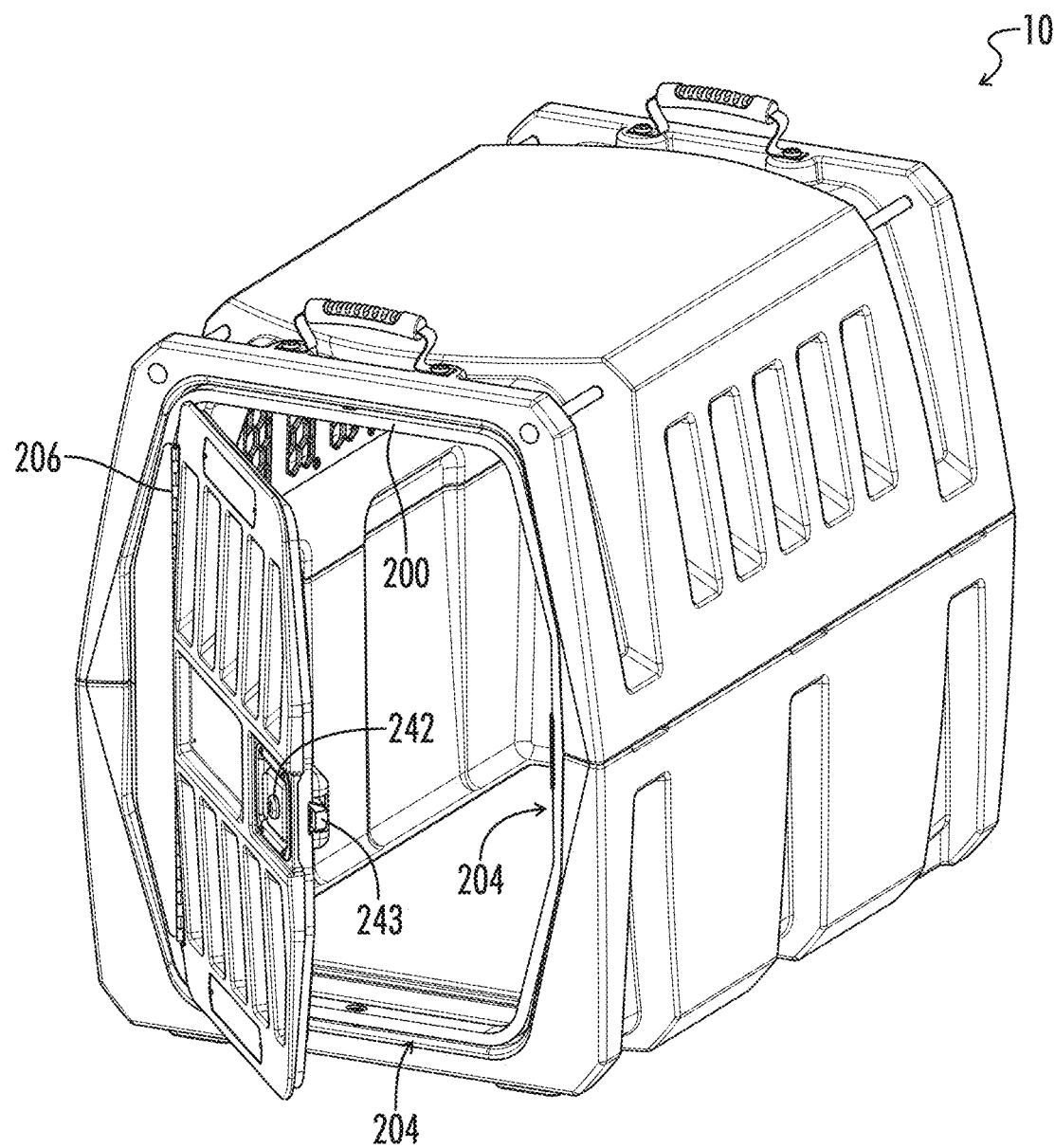
FIG. 17 illustrates a perspective view of an embodiment of an animal enclosure in accordance with the present disclosure.

In some alternative embodiments, shown in FIGS. 17-32, various additional embodiments of an animal enclosure, crate or kennel are shown. Kennel 10 includes a door mounted on a hinge. The door includes a door molded of a reinforced polymer material in some embodiments. In some embodiments, the door includes a glass-reinforced nylon material formed by injection molding. As seen in FIG. 17, the door is mounted to the kennel along a vertical edge of the door. A piano-type upright hinge is positioned between the door and a frame member to allow the door to pivot from an open position to a closed position relative to the kennel.

Figure 18:
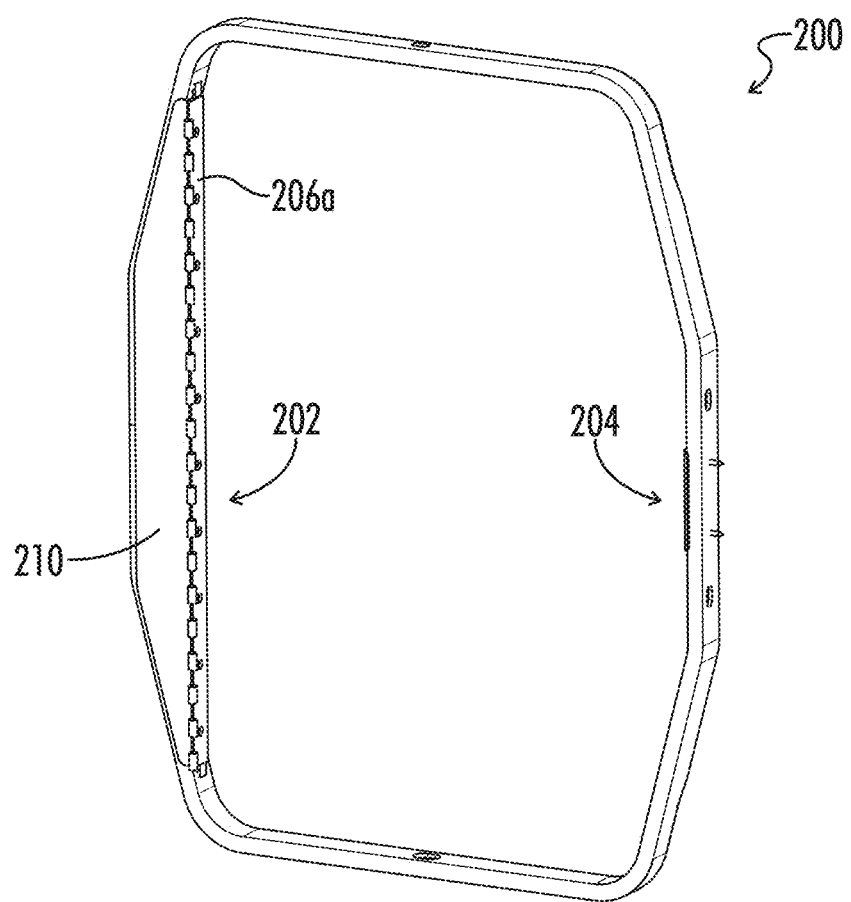
FIG. 18 illustrates a perspective view of an embodiment of a door frame in accordance with the present disclosure.
Figure 19:
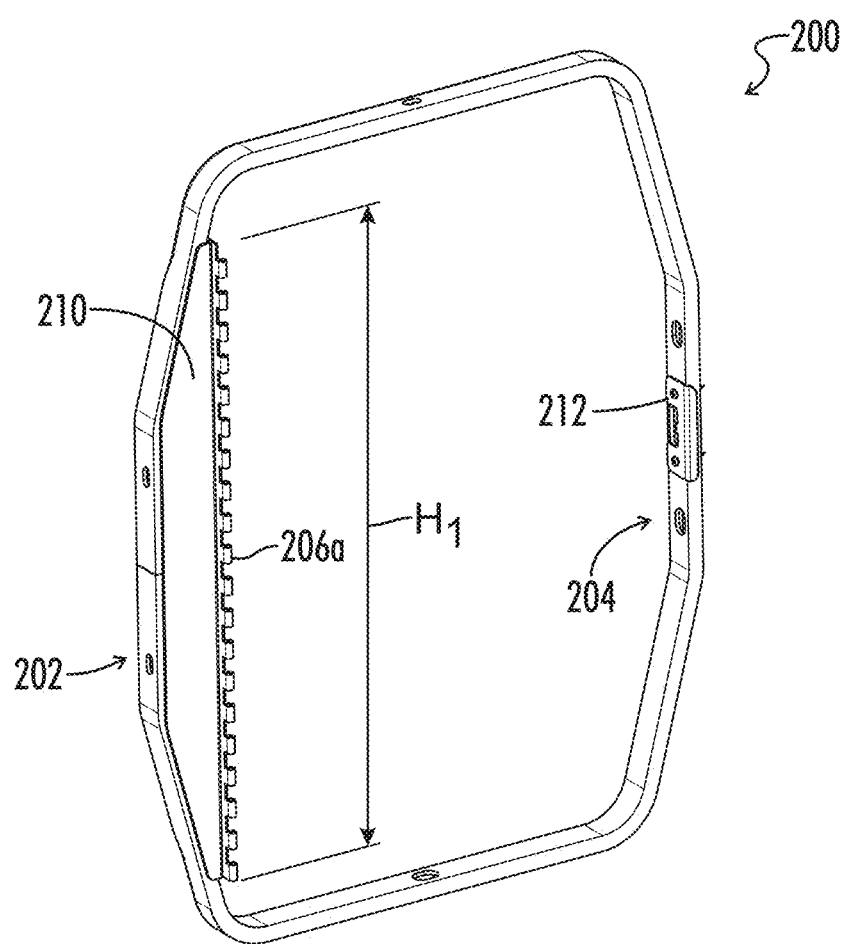
FIG. 19 illustrates a perspective view of an embodiment of a door frame in accordance with the present disclosure.

An embodiment of a door frame 200 is shown in FIG. 18. The door frame includes a hoop-shaped frame formed of a rigid material such as metal, composite, polymer, or any other suitable material. The door frame 200 may be mounted proximate to the opening of the kennel in some embodiments. The door frame is seated in a corresponding frame recess 240 molded or otherwise formed in the kennel at the opening of the kennel. The door frame 200 may be secured to the kennel using one or more mechanical fasteners such as bolts, screws, rivets, or other suitable fasteners. In some embodiments, the frame 200 is fit in place using a mechanical interference fit or a friction fit with the kennel itself. The door frame includes a rigid one-piece material that is bent to match the shape of the opening in the kennel in some embodiments. The door frame material comprises aluminum in some embodiments to provide strength and corrosion-resistance while also reducing weight of the kennel. The door frame 200 in some embodiments is held in place on the kennel using one or more threaded fasteners each inserted through a hole in the frame 200 and engaging a corresponding threaded socket positioned on the kennel. In some embodiments, the threaded sockets are integrally molded or otherwise embedded in the kennel. The door frame includes a hinge side 202 and a latch side 204. The door mounts to the frame on the hinge side using a door hinge 206 shown in FIG. 17. The door hinge may include any suitable hinge.

Figure 22:
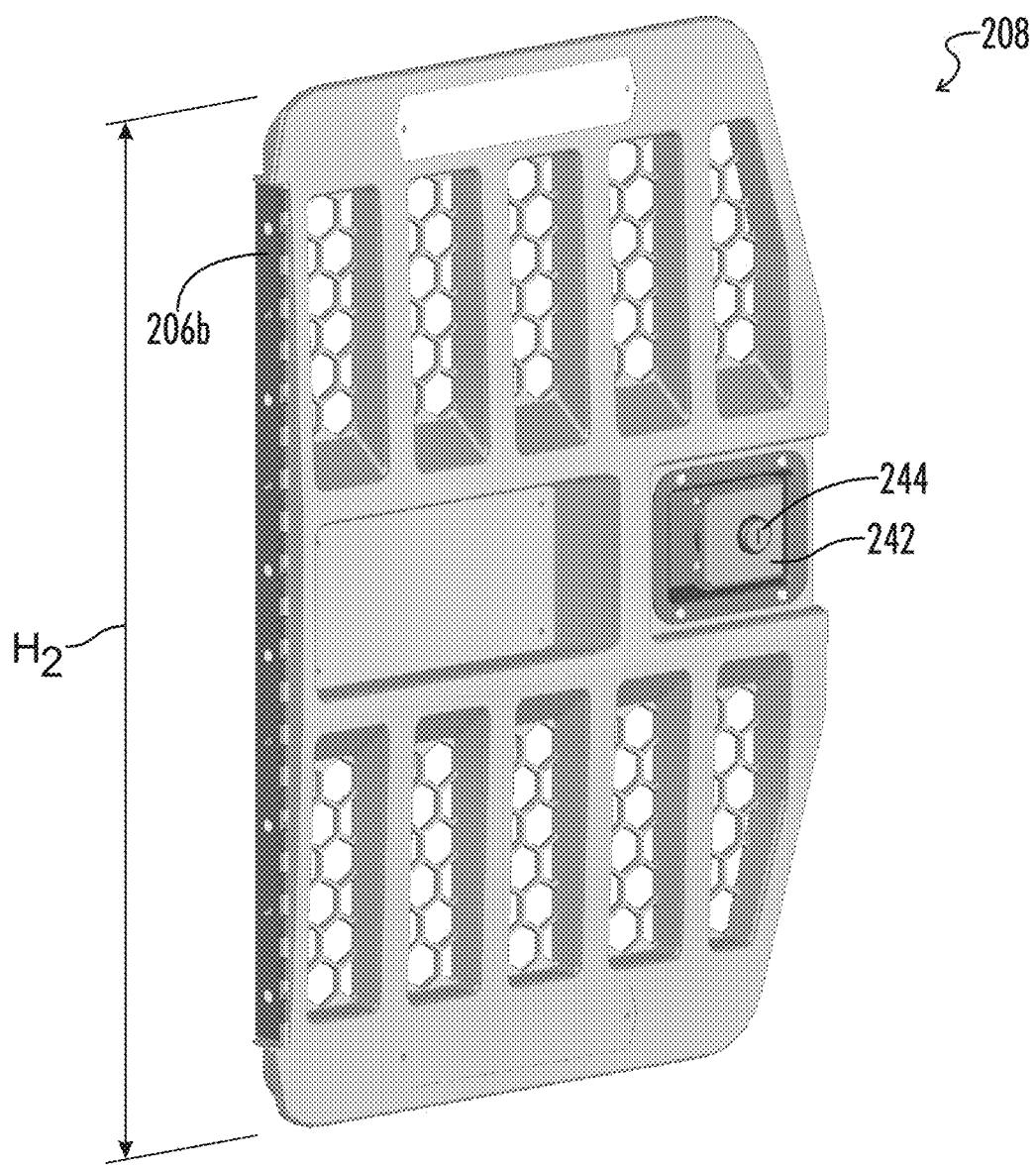
FIG. 22 illustrates a perspective view of an embodiment of a door in accordance with the present disclosure.

In some embodiments, door hinge 206 includes a piano-type hinge having a first hinge member 206a attached to the frame, shown in FIG. 18, and a second hinge member 206b attached to the door 208, shown in FIG. 22. First hinge member 206a is secured to the frame 200 using one or more fasteners in some embodiments. An intermediate mounting member, or jamb plate 210 is positioned on the hinge side 202 of the frame 200 in some embodiments. The jamb plate 210 is secured directly to the frame material, such as the aluminum bar forming the hoop-shaped frame member in some embodiments. The jamb plate 210 may be welded directly to the frame material, or in other embodiments, the jamb plate 210 is secured to the frame material using one or more mechanical fasteners. The first hinge member 206a is secured to the jamb plate 210 in some embodiments. As such, the jamb plate 210 provides a mounting member on which to mount the hinge 206 or a portion of the hinge. The opening of the frame 200 has a tapered profile that narrows laterally at the top and narrows laterally at the bottom of the frame opening. The jamb plate 210 provides a continuous linear upright mounting location that spans a sufficient vertical distance to mount a linear piano hinge in some embodiments such that the height of the hinge is proportional to the height of the door. For example, in some embodiments, the hinge height is greater than 50% of the height of the door. Providing a continuous linear hinge height that is proportional to the height of the door prevents the door from inadvertently twisting or flexing during use.

Opposite the hinge side of the door 202 is the latch side of the door 204. The latch side of the door provides a location where the door latch may engage one or more structures to secure the door in a closed position. In some embodiments, a latch 242 is disposed on the door, and the latch includes a latch member 243 protruding laterally from the latch toward the kennel wall. The latch member 243 is selectively moveable to engage or disengage a strike plate for opening and closing the door. In some embodiments, a strike plate 212 is mounted on the latch side 204 of door frame 200. Strike plate 212 may be a separate item that is fastened in place on the door frame using one or more fasteners in some embodiments. In alternative embodiments, strike plate 212 is welded to the door frame member. In further embodiments, strike plate 212 is integrally formed on the frame member material. The latch member engages a corresponding recess or void in the strike plate to secure the door in a closed position.

Figure 20:
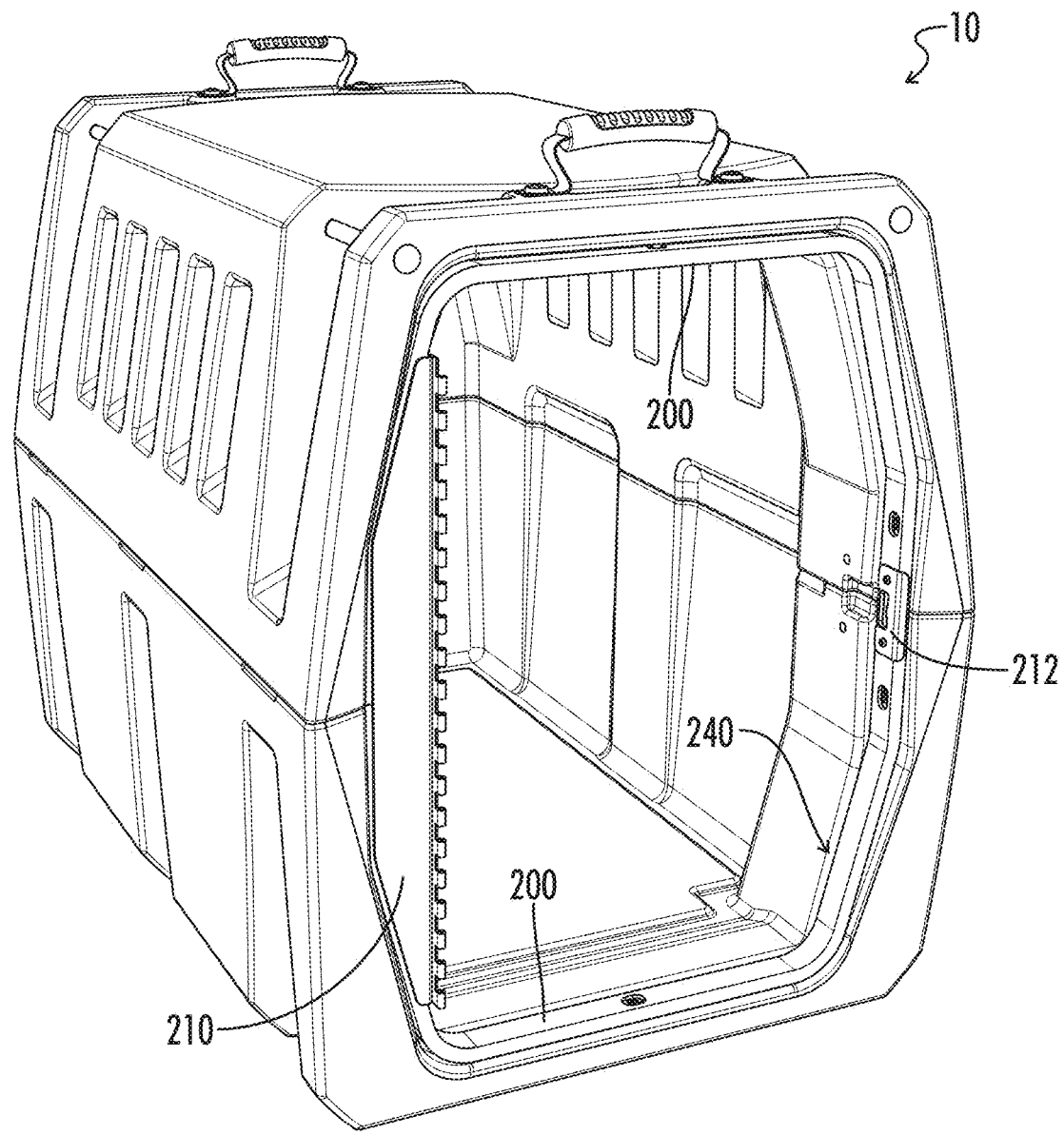
FIG. 20 illustrates a perspective view of an embodiment of a door frame installed in an animal enclosure in accordance with the present disclosure.
Figure 21:
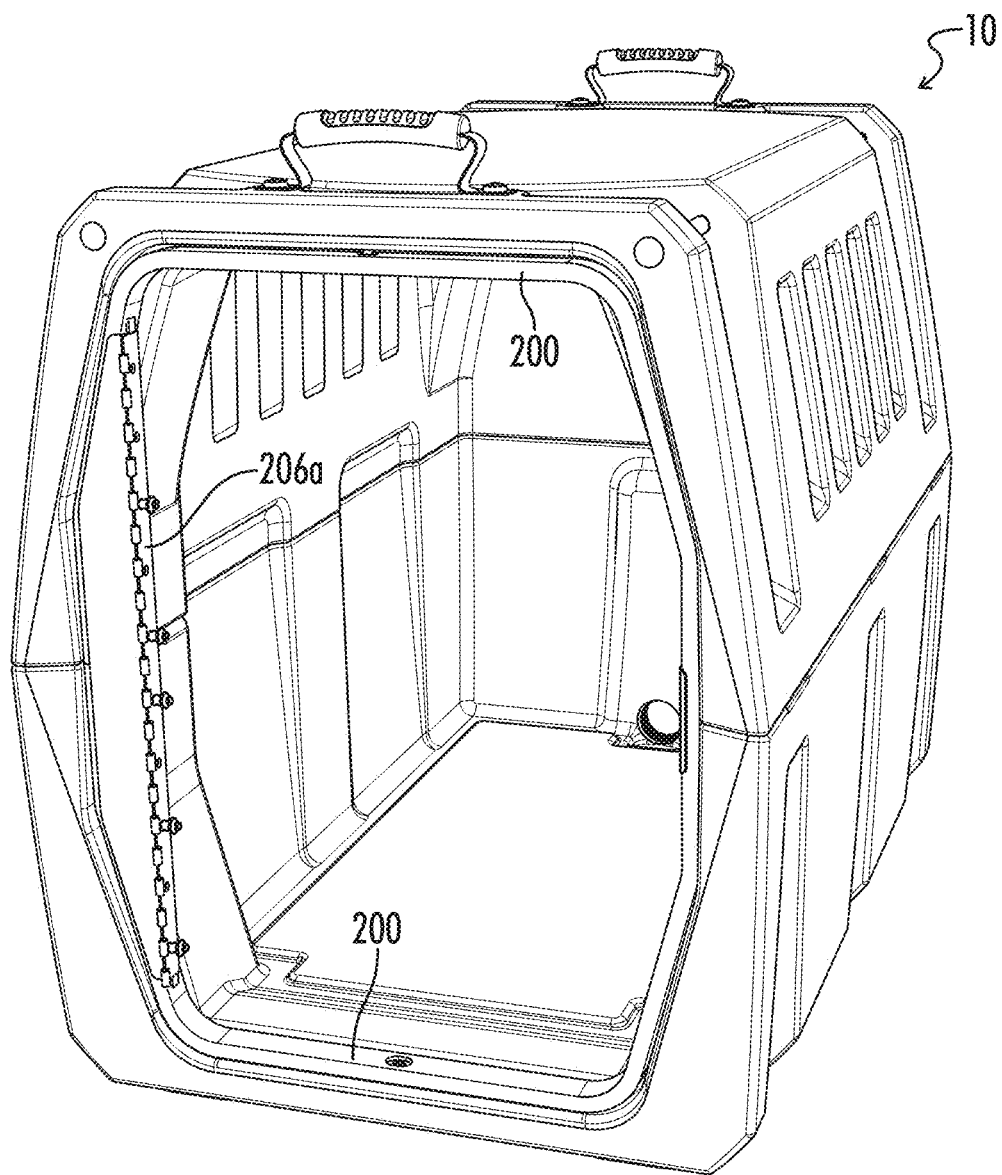
FIG. 21 illustrates a perspective view of an embodiment of a door frame installed in an animal enclosure in accordance with the present disclosure.

Referring to FIGS. 20-21, the hoop-shaped door frame together with the strike plate and the jamb plate 210 form a door frame assembly. The door frame assembly is installed on the kennel at the door opening. In some embodiments, the first hinge member is mounted on the jamb plate 210 along the hinge side of the door frame.

Referring to FIG. 22, a door 208 includes a door hinge side and a door latch side. The door 208 includes a mating second hinge member 206b mounted on the door hinge side of the door 208. The second hinge member 206b includes a continuous linear piano hinge member in some embodiments. Second hinge member 206b may be fastened to door 208 using one or more mechanical fasteners. In additional embodiments, second hinge member 206b may be integrally formed on door 208 or welded on door 208. Door 208 includes a door height H2 greater than the height of the door hinge H1. In some embodiments the ratio of H1/H2 is between about 0.5 and about 1.0. In other embodiments, the ratio of H1/H2 is between about 0.7 and about 1.0.

Figure 23:
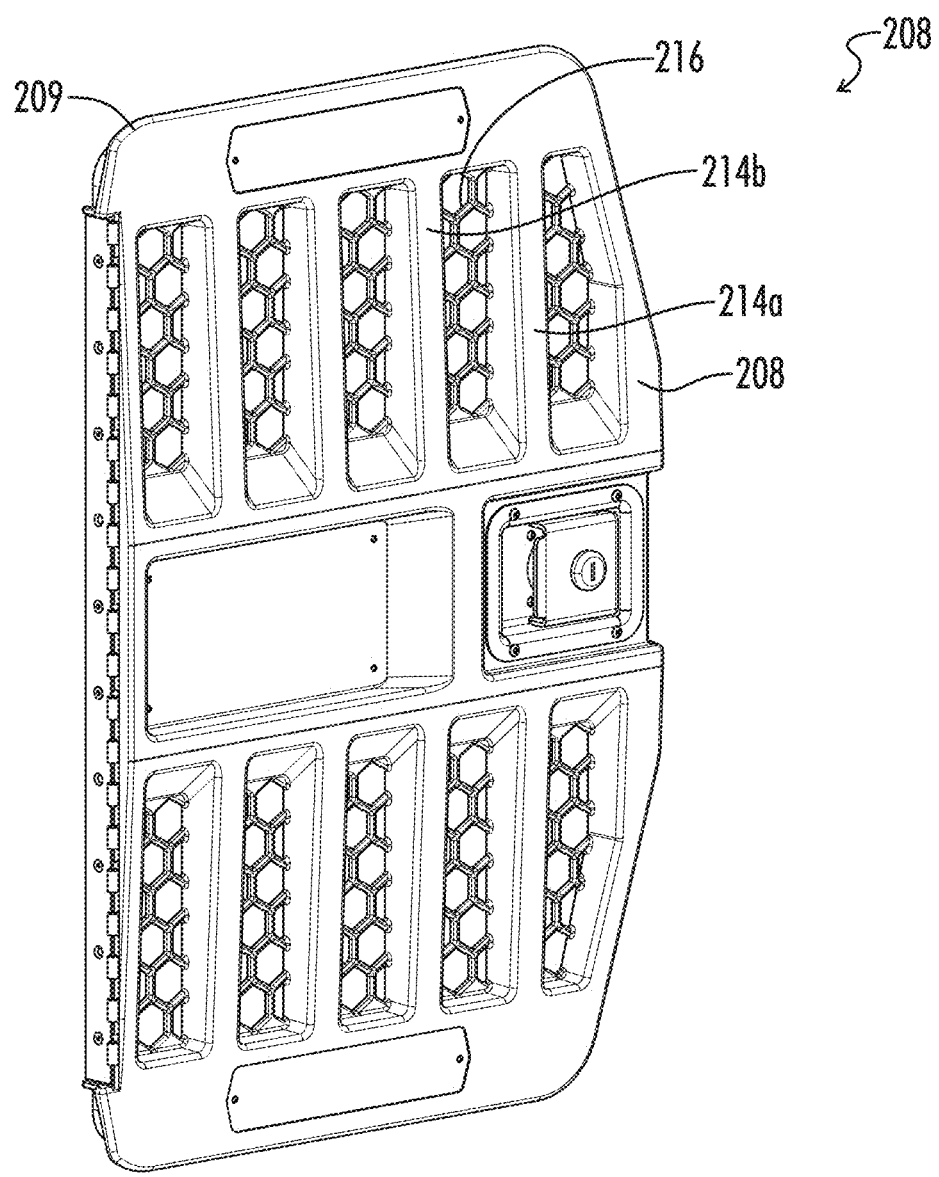
FIG. 23 illustrates a perspective view of an embodiment of a door in accordance with the present disclosure.
Figure 24:
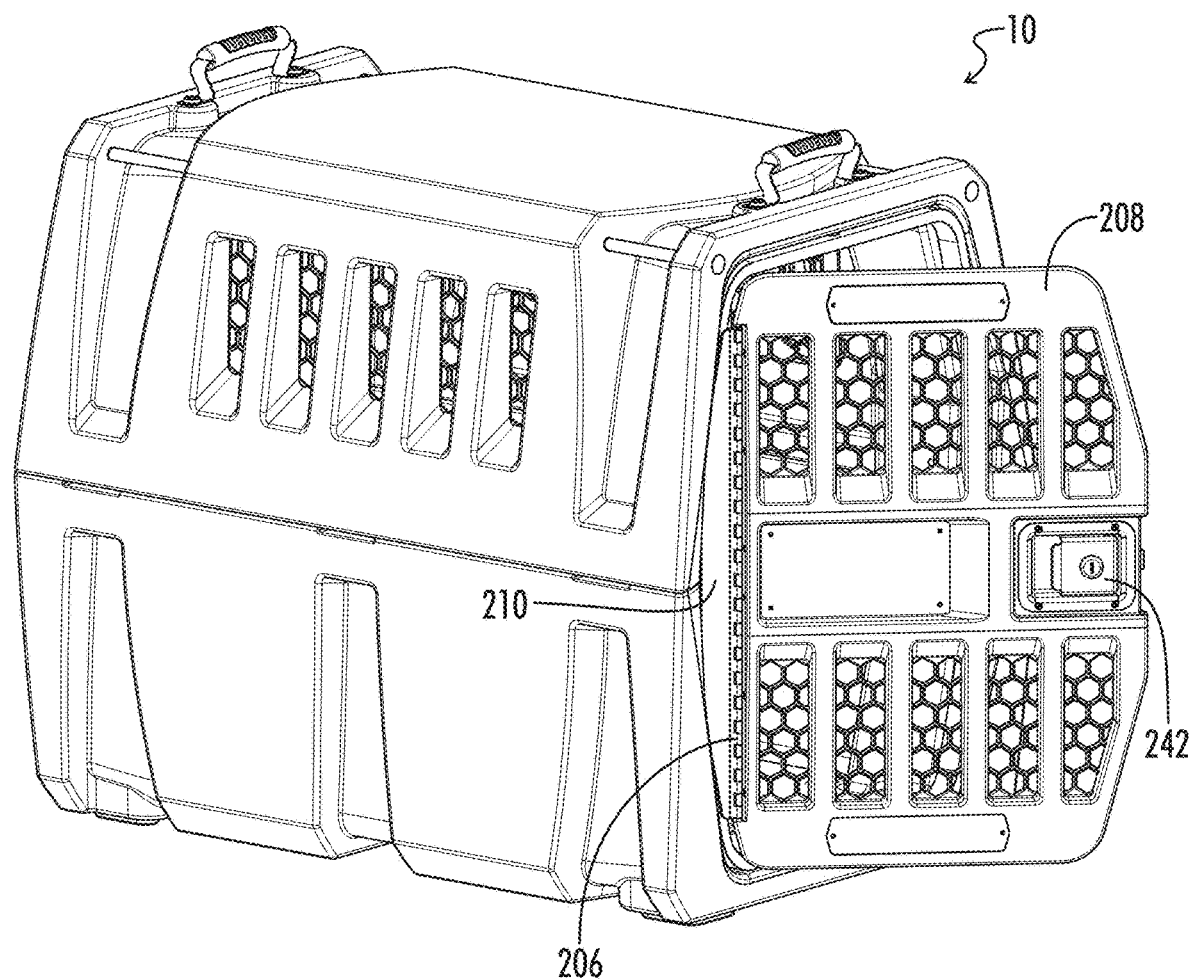
FIG. 24 illustrates a perspective view of an embodiment of an animal enclosure in accordance with the present disclosure.

Referring to FIG. 23, door 208 includes a plurality of upright door bars 214a, 214b integrally formed in the door. The door bars 214 are separated by gaps between the door bars. The gaps between the door bars provide openings where air may circulate into or out of the kennel. In some embodiments, a porous grille 216 is positioned between the door bars covering the openings. The porous grille 216 includes a honeycomb pattern in some embodiments, providing passages in the grille inside the honeycomb pattern. The grille 216 operates to prevent an animal's extremities from passing through the openings between the door bars in some applications. The door bars 214 and porous grille 216 are all integrally formed in the door 208 in some embodiments. The door bars 214 and porous grille 216 may be formed in an injection molding manufacturing process as a unitary, one-piece molding in some embodiments.

Figure 25:
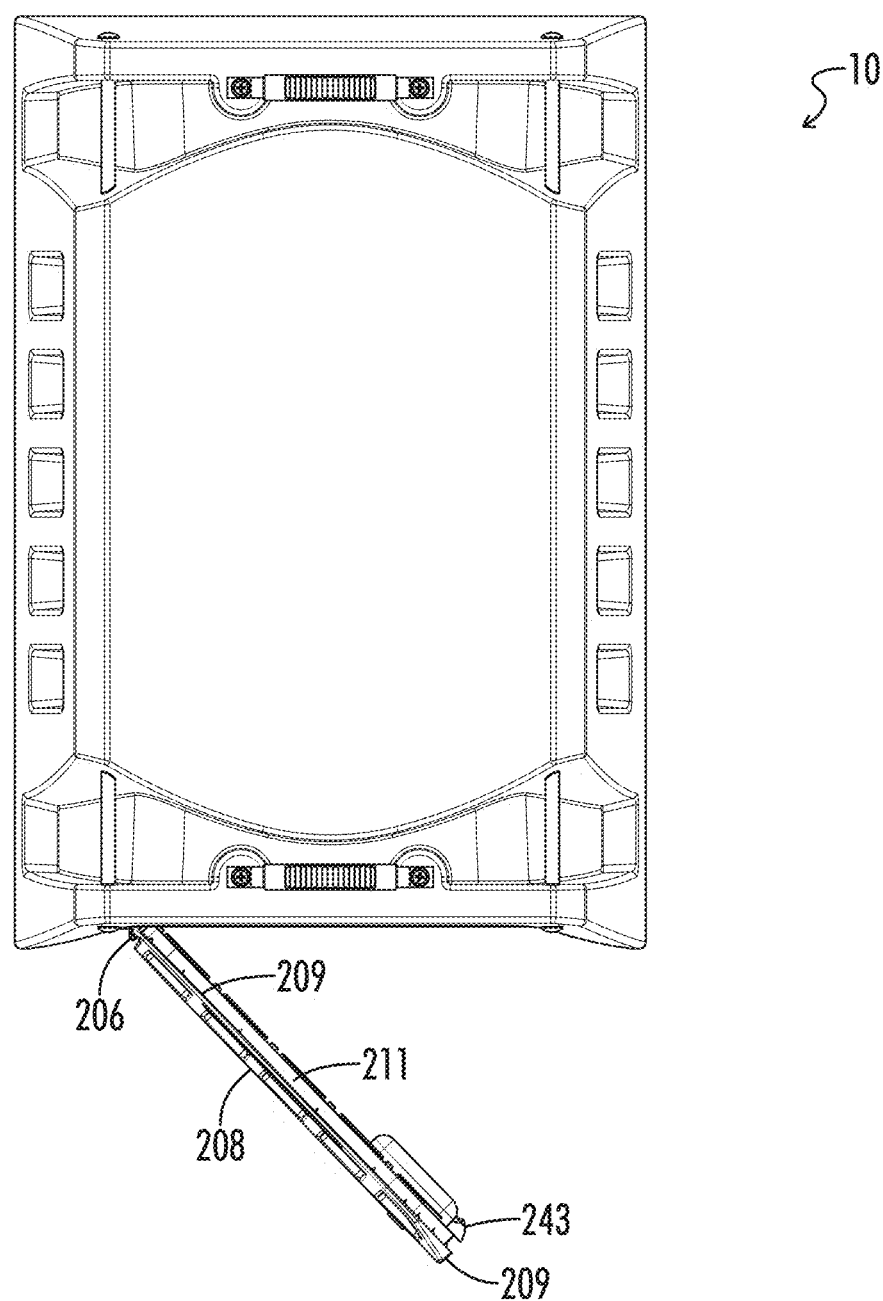
FIG. 25 illustrates a top view of an embodiment of an animal enclosure with a door partially open in accordance with the present disclosure.

Referring further to FIG. 23, in some embodiments, door 208 includes a door flange 209, also seen in FIG. 25. Door flange includes a portion of door 208 that extends outwardly from the door around the perimeter of the door. In some embodiments, door flange 209 is continuous along the top and bottom of the door and along the latch side of the door. In other embodiments, door flange 209 only extends from the door along a portion of the perimeter of the door along the top or bottom of the door or along the latch side of the door. Door flange 209 extends outwardly beyond the opening defined by the door frame such that the door flange 209 interferes with the door frame when the door is moved to a closed position. As such, a portion of door flange 209 rests against the outwardly facing portion of the door frame when the door is in a closed position. The door flange 209 thus provides an angular stop for the door when the door is angularly moved about hinge 206 relative to the door frame.

Figure 30:
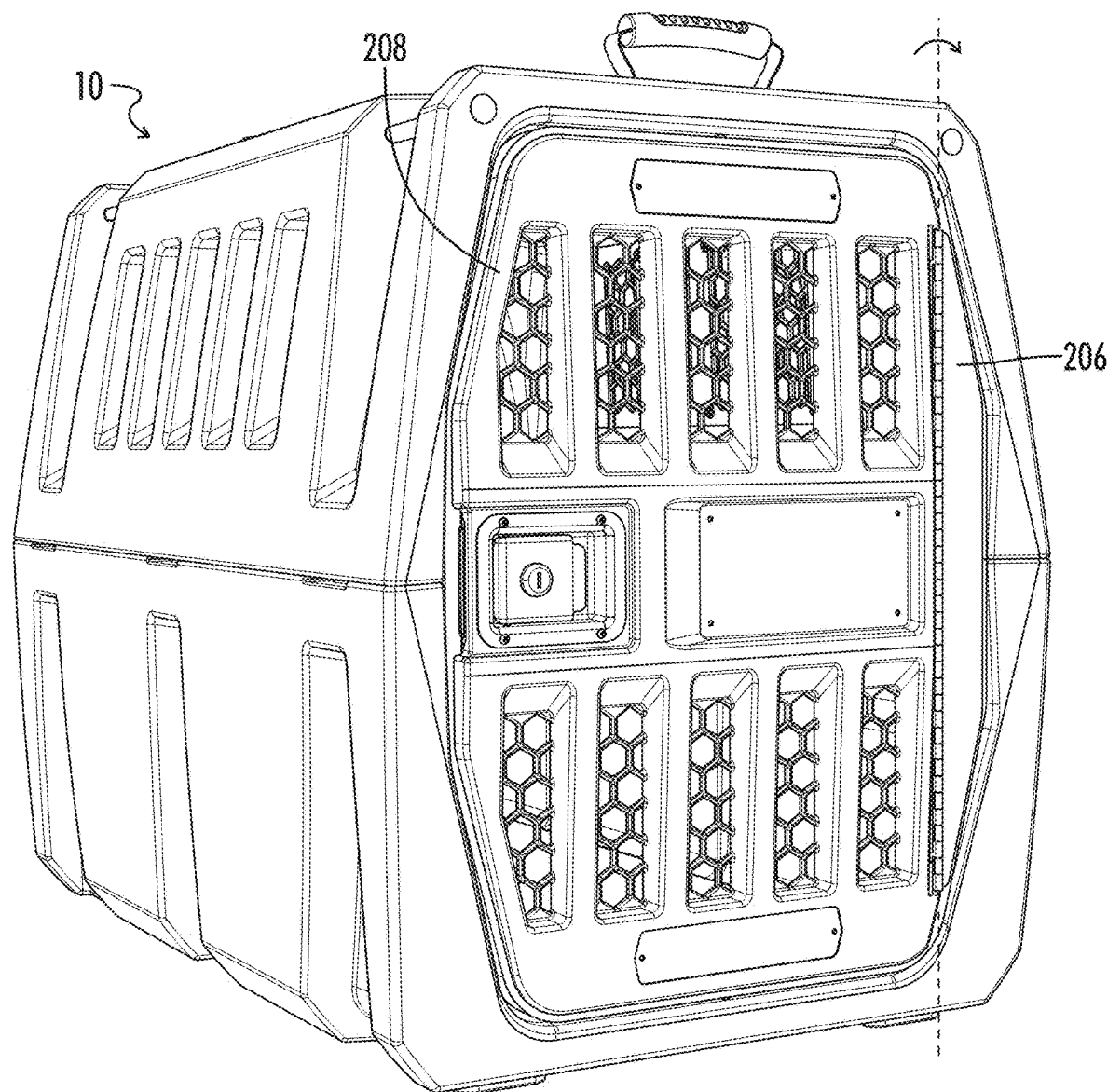
FIG. 30 illustrates a perspective view of an embodiment of an animal enclosure in accordance with the present disclosure.
Figure 31:
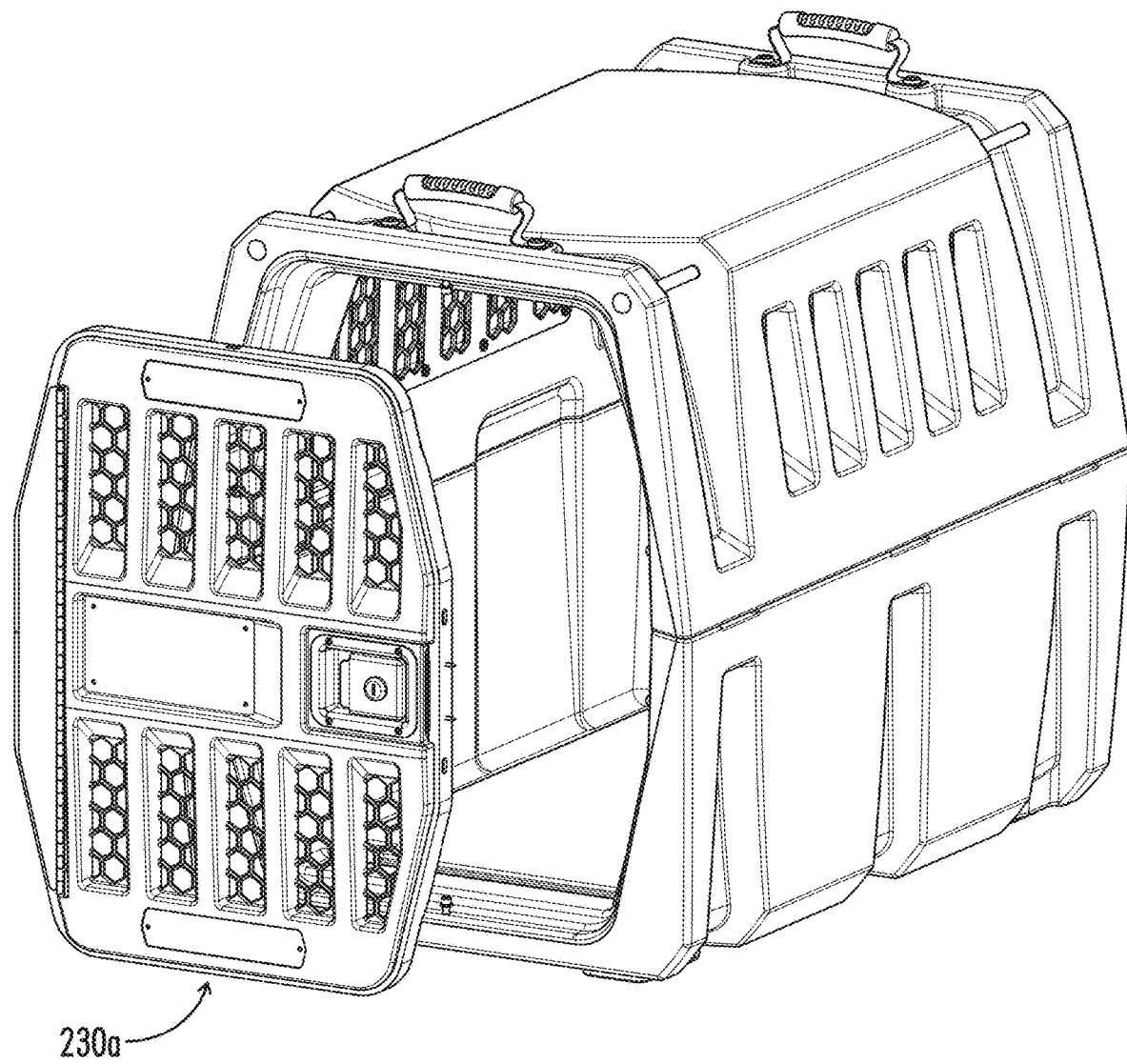
FIG. 31 illustrates a partially exploded perspective view of an embodiment of an animal enclosure with the door assembly positioned for right hand opening in accordance with the present disclosure.
Figure 32:
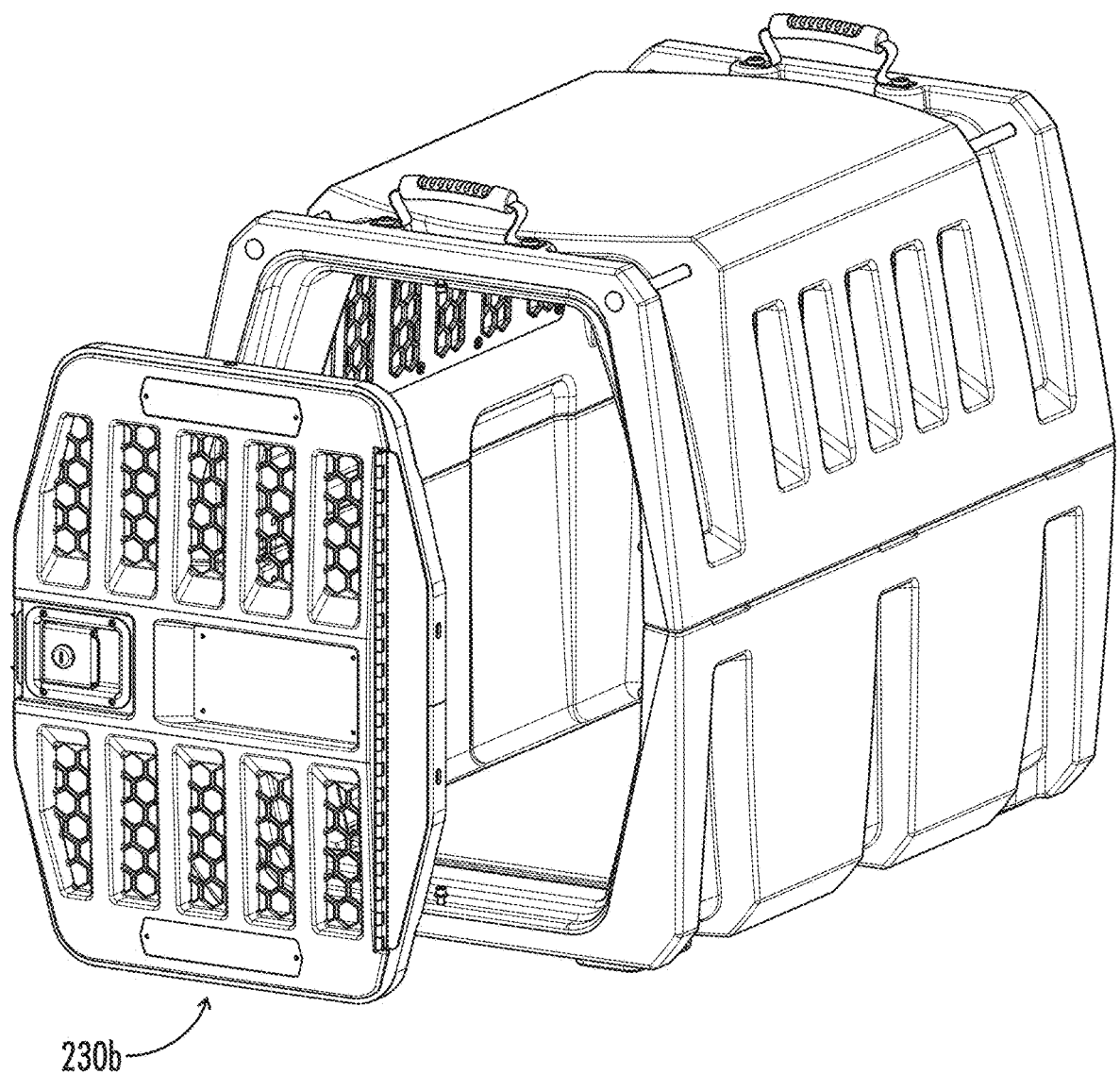
FIG. 32 illustrates a partially exploded perspective view of an embodiment of an animal enclosure with the door assembly positioned for left hand opening in accordance with the present disclosure.

As seen in FIG. 30, one or more non-skid feet are positioned on the kennel to support the kennel when positioned against a surface such as ground, a floor, or the inside of a vehicle or truck bed. FIG. 31 shows a perspective view of an embodiment of a kennel with a door in a partially open position. FIG. 32 shows a left side elevation view of an embodiment of a kennel. FIG. 33 shows a right side elevation view of an embodiment of a kennel. FIG. 34 shows a bottom view of an embodiment of a kennel. FIG. 35 shows a back elevation view of an embodiment of a kennel. FIG. 36 shows a left side elevation view of an embodiment of a kennel with a side opening grille installed. FIG. 37 shows a top view of an embodiment of a kennel. FIGS. 38 and 39 show embodiments of a kennel 10 including a door 208 secured to the door frame 200 at a continuous linear vertical hinge 206. The hinge is secured to the frame using an intermediate jamb plate 210 to provide a vertical mounting location for the hinge. The jamb plate 210 is secured to the frame using a fastener. In additional embodiments, the jamb plate 210 is a jamb member integrally formed on a portion of the door frame. In such embodiments, the hinge attaches directly to the door frame.

Figure 27:
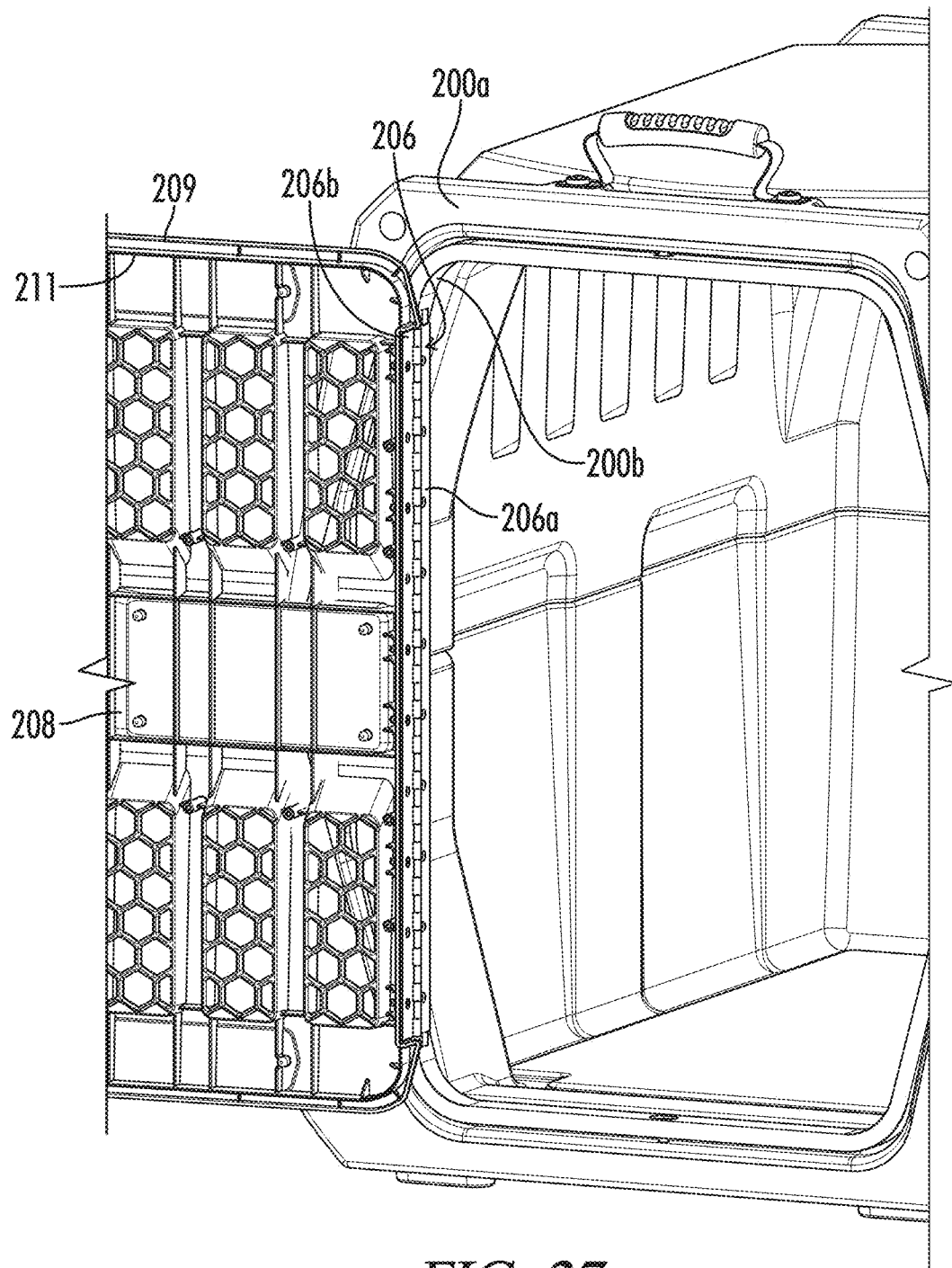
FIG. 27 illustrates a perspective view of an embodiment of an animal enclosure with a door in an open position in accordance with the present disclosure.

Referring further to FIG. 27, an embodiment of a kennel with a door in an open position is shown. Door 208 is attached to frame 200 using a hinge 206. Hinge 206 includes a first hinge member 206a secured to the door frame 200, and hinge 206 includes a second hinge member 206b secured to the hinge side of the door 208. Hinge 206 forms a linear piano-type hinge in some embodiments. Hinge 206 includes a vertical orientation in some embodiments. Hinge 206 is secured to door 208 using a plurality of fasteners in some embodiments. First hinge member 206a is secured to a portion of frame 200 forming a vertically-straight jamb plate, providing a substantially flat, upright mounting surface for securing first hinge member 206a in some embodiments.

Referring further to FIG. 27, door 208 includes a door flange 209 extending radially outwardly from the center of the door panel. Door flange 209 provides a flange member that rests against the outward-facing portion 200a of door frame 200 when door 208 is in the closed position. Door 208 also includes an inner flange 211 protruding from the door panel toward the inside of the kennel when the door is in the closed position. Inner flange 211 provides an inwardly-extending flange that provides structural rigidity to the perimeter of door 208. In some embodiments, inner flange 211 may engage an inward-facing portion of door frame 200b when door 208 is in the closed position. Door 208 may open about 180 degrees in some embodiments when first and second hinge members are in a substantially co-planar orientation.

Figure 28:
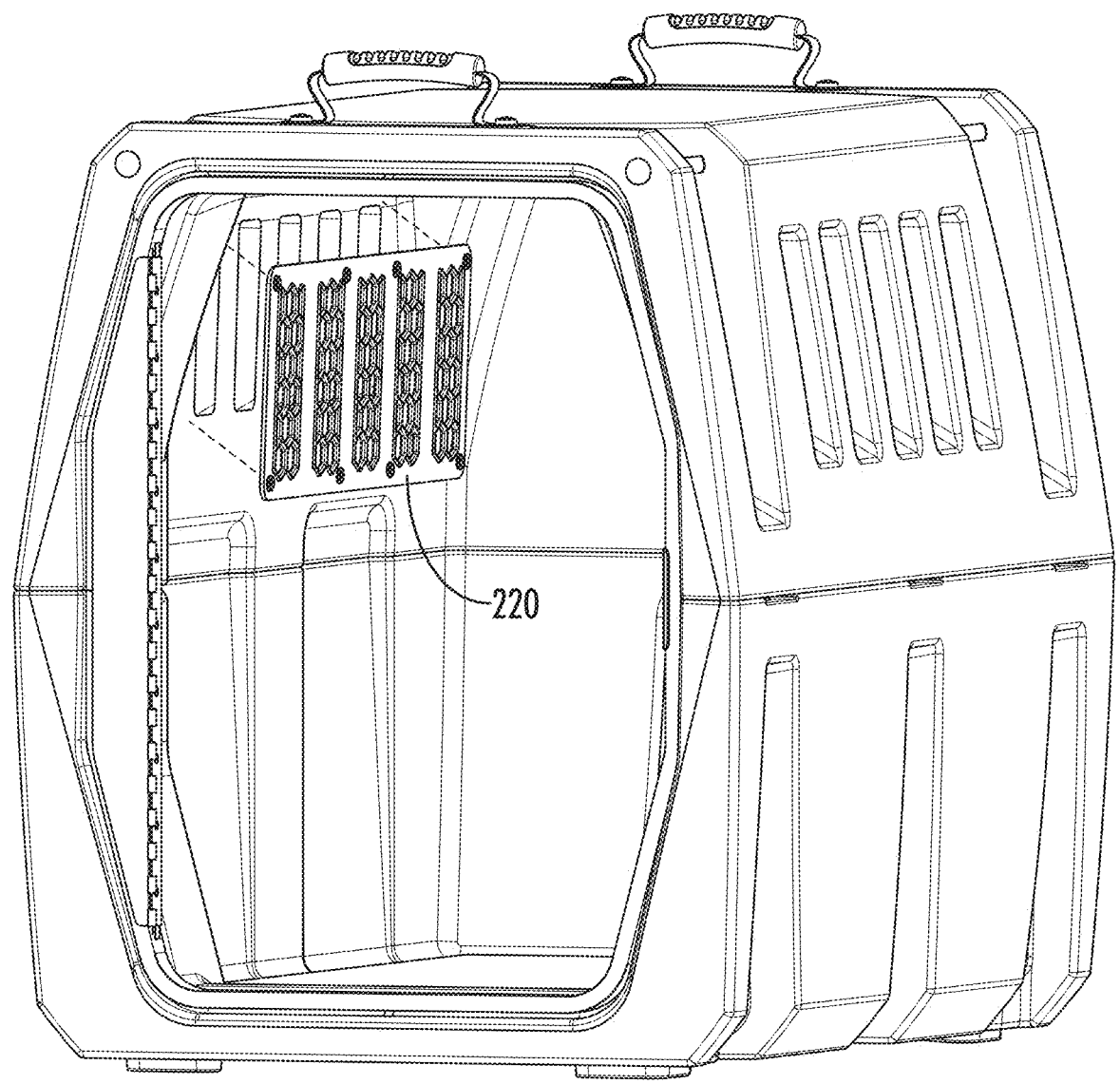
FIG. 28 illustrates a front perspective view of an embodiment of an animal enclosure showing an exploded view of a side grille in accordance with the present disclosure.
Figure 29:
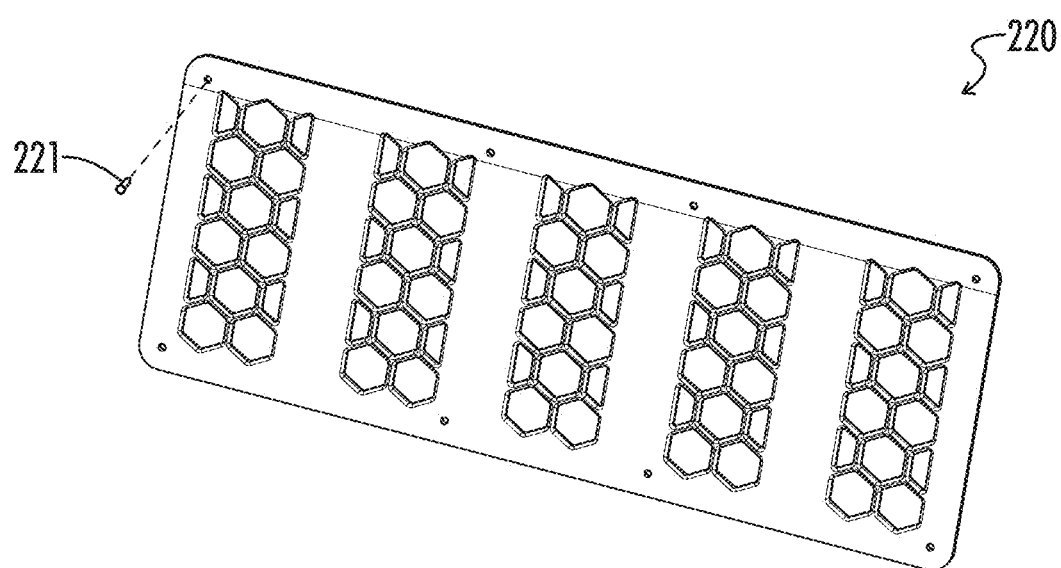
FIG. 29 illustrates a perspective view of an embodiment of a side grill in accordance with the present disclosure.

As shown in FIGS. 28-29, kennel 10 in some embodiments is configured to include one or more side grilles 220. Kennel 10 includes a plurality of side bars provided on the sides of kennel 10. Side bars are separated by openings that allow air to pass into and out of the kennel for ventilation. Side bars may be oriented vertically or may also be oriented at an angle relative to the kennel. In some applications, the openings between side bars are large enough to allow animal extremities to pass between the bars. One or more removable side grilles are positioned on the kennel 10 to partially block the openings between side bars. Side grille 220 includes a porous panel with passages that allow air to pass through the panel. In some embodiments, side grille 220 includes a honeycomb profile with passages in the honeycomb pattern. Each side grille 220 may be secured to the interior of the kennel using one or more grille fasteners 221. Each grille fastener 221 may engage a corresponding threaded socket in the kennel. Each threaded socket may be integrally formed in the kennel body. Each side grille 220 may also be secured to the kennel using other types of suitable attachments. In some embodiments, one or more self-tapping screws may be installed through corresponding holes in the side grille directly into the kennel wall material to secure the side grille 220 to the kennel.

Figure 26:
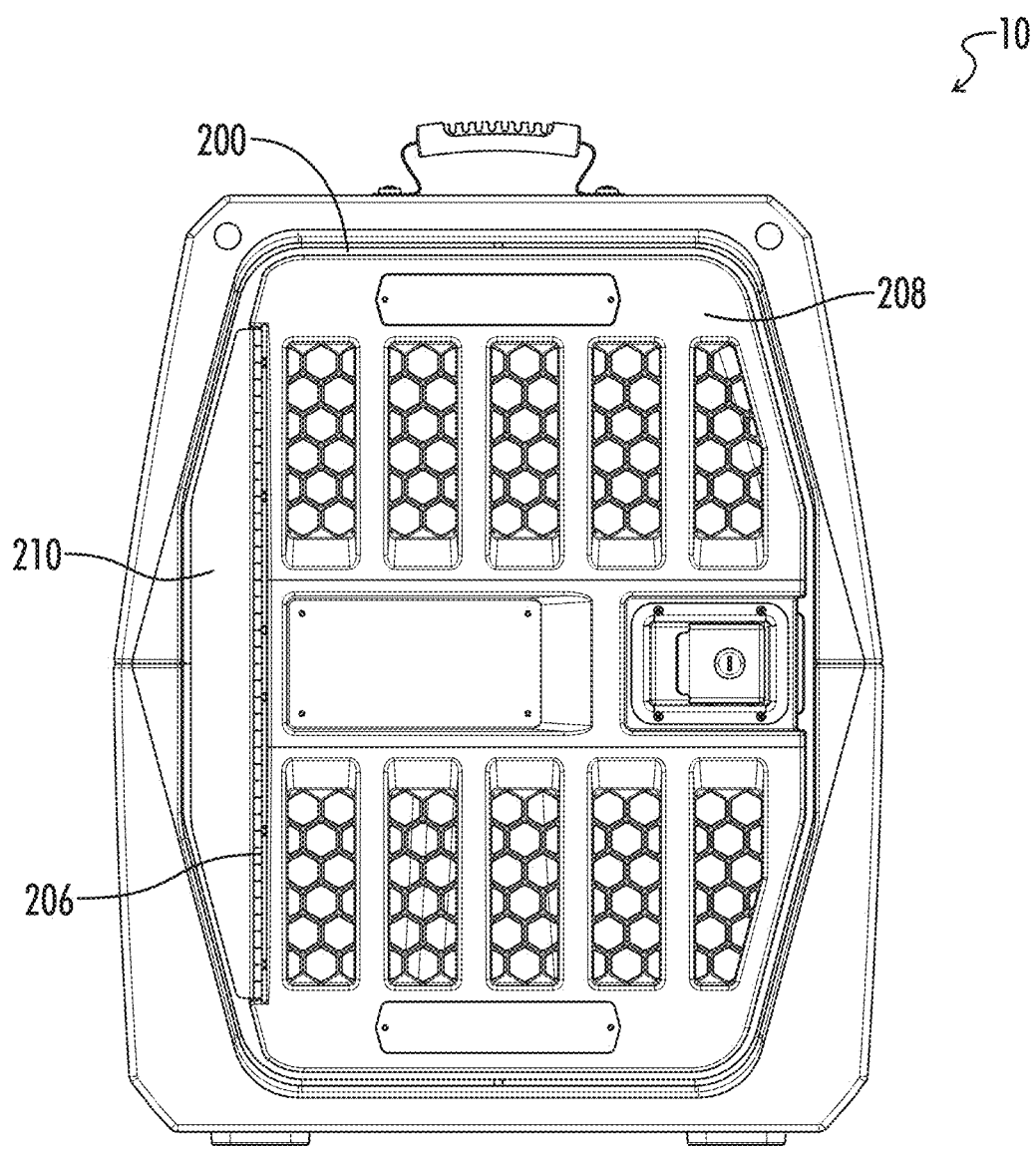
FIG. 26 illustrates a front elevation view of an embodiment of an animal enclosure with a door in closed position in accordance with the present disclosure.

Referring further to FIGS. 30-32, in some embodiments, kennel 10 is configured to allow hinge 206 to be mounted on either side of the kennel to allow for right-handed or left-handed opening. For example, as seen in FIG. 26, hinge 206 is mounted on the left side of the kennel such that the door 208 unlatches from the right side and pivots about an axis vertically aligned on the left side of the kennel. As seen in FIG. 30, hinge 206 is mounted on the right side of the kennel such that the door 208 unlatches from the left side and pivots about an axis vertically aligned on the right side of the kennel. Frame 200 and door 208, along with the hinge, the jamb plate and the strike plate form a door assembly that may be detached from the kennel body. The door assembly may be secured to the kennel using a plurality of frame fasteners that extend through holes in the frame and attach to threaded sockets in the upper and lower crate members. When the frame fasteners are removed, the frame assembly may be removed from the kennel as a complete unit in a first orientation 230a, as shown in FIG. 31. The kennel opening and door assembly are symmetrical in some embodiments such that the door assembly may be simply flipped 180 degrees such that the latch and the hinge swap sides to achieve a second orientation 230b, as seen in FIG. 32. From this position, the door assembly may be easily re-installed on the kennel using the same frame fasteners, but with the hinge on the opposite side of the previous orientation. This allows the door to be configured in both left-open and right-open configurations using the same hardware in an interchangeable manner.

Thus, although there have been described particular embodiments of the present invention of a new and useful Animal Enclosure it is not intended that such references be construed as limitations upon the scope of this invention except as set forth in the following Claims

What is claimed is:

1. An animal enclosure apparatus, comprising:
   a kennel body including a rotational molded wall formed from a plastic material, the kennel body defining an interior space shaped to accommodate one or more animals, the kennel body defining a door opening shaped to allow the animal to enter and exit the kennel body;
   a removable hoop-shaped door frame disposed on the kennel body proximate the door opening, the door frame including a hinge side and a latch side opposite the hinge side;
   a frame recess molded in the kennel body around the door opening, wherein the door frame is seated in the frame recess;
   a plurality of fastener holes defined in the door frame;
   a plurality of frame fasteners disposed on the door frame, each one of the plurality of frame fasteners extending into one of the plurality of fastener holes defined in the door frame and also extending into the kennel body, thereby securing the door frame to the kennel body;
   a door pivotally disposed on the door frame, wherein the door is pivotally moveable relative to the door frame between an open position and a closed position;
   the door including a plurality of upright door bars separated by gaps between the plurality of door bars, and a porous grille positioned between each of the plurality of door bars on the door, the door bars and porous grille integrally molded in the door;
   a latch disposed on the door, the latch including a latch member protruding laterally from the latch toward the door frame, the latch member selectively moveable for opening and closing the door;
   the kennel body including a first upper edge and a second upper edge opposite the first upper edge;
   a first attachment bar disposed on the first upper edge of the kennel body and a first attachment recess integrally formed in the kennel body, wherein the first attachment bar is disposed in the first attachment recess;
   a second attachment bar disposed on the first upper edge of the kennel body;
   a third attachment bar disposed on the second upper edge of the kennel body; and
   a fourth attachment bar disposed on the second upper edge of the kennel body.

2. The apparatus of claim 1, further comprising a second attachment recess integrally formed in the kennel body, wherein the second attachment bar is disposed in the second attachment recess.

3. The apparatus of claim 2, further comprising a third attachment recess integrally formed in the kennel body, wherein the third attachment bar is disposed in the third attachment recess.

4. The apparatus of claim 3, further comprising a fourth attachment recess integrally formed in the kennel body, wherein the fourth attachment bar is disposed in the fourth attachment recess.

5. The apparatus of claim 4, wherein the first, second, third and fourth attachment recesses each provide clearance space for passage of one or more tie-downs, webbing, strap, rope or chains for securing the kennel body to a structure.

6. The apparatus of claim 4, wherein each of the first, second, third and fourth attachment bars comprise metal.

7. The apparatus of claim 4, further comprising the kennel body having an outer profile, wherein each of the first, second, third and fourth attachment bars is flushly mounted along the outer profile of the kennel body along the outer profile.

8. The apparatus of claim 1, wherein the porous grill on the door includes a honeycomb pattern.

9. The apparatus of claim 1, wherein the plurality of door bars and porous grille are formed in an injection molding manufacturing process as a unitary, one-piece molding.

10. The apparatus of claim 1, further comprising the door including a door flange extending outwardly from the door such that the door flange interferes with the door frame when the door is moved to a closed position.

11. The apparatus of claim 10, wherein the door flange provides an angular stop for the door when the door is angularly moved about the hinge relative to the door frame.

12. The apparatus of claim 1, wherein the door is configurable in a left-handed opening position and a right-handed opening position.

13. The apparatus of claim 1, wherein the door is moveable relative to the kennel body between a first position configured for a left-handed opening position and a second position configured for a right-handed opening position.

14. An animal enclosure apparatus, comprising:
   a rotational molded kennel body defining an interior space shaped to accommodate one or more animals, the kennel body defining a door opening shaped to allow the animal to enter and exit the kennel body;
   a hoop-shaped door frame disposed on the kennel body proximate the door opening, the door frame including a plurality of fastener holes defined in the door frame;
   a plurality of frame fasteners disposed on the door frame, each one of the plurality of frame fasteners extending into one of the plurality of fastener holes defined in the door frame and also extending into the kennel body, thereby securing the door frame to the kennel body;
   a removable door disposed on the door frame, wherein the door is pivotally moveable relative to the door frame between an open position and a closed position, wherein the door is reversible between a left-handed opening position and a right-handed opening position;
   the door including a plurality of upright door bars separated by gaps between the plurality of door bars, and a porous grille positioned in the gaps between each of the plurality of door bars on the door;
   a latch disposed on the door, the latch including a latch member protruding laterally from the latch toward the door frame, the latch member selectively moveable for opening and closing the door;
   a first attachment bar disposed on the kennel body;
   a second attachment bar disposed on the kennel body;
   a third attachment bar disposed on the kennel body; and
   a fourth attachment bar disposed on the kennel body; and
   a first attachment recess integrally formed in the kennel body, wherein the first attachment bar is positioned in the first attachment recess.

15. The apparatus of claim 14, further comprising a second attachment recess integrally formed in the kennel body, wherein the second attachment bar is positioned in the second attachment recess.

16. The apparatus of claim 15, further comprising a third attachment recess integrally formed in the kennel body, wherein the third attachment bar is positioned in the third attachment recess.

17. The apparatus of claim 16, further comprising a fourth attachment recess integrally formed in the kennel body, wherein the fourth attachment bar is positioned in the fourth attachment recess.

18. The apparatus of claim 17, wherein the first, second, third and fourth attachment recesses each provide clearance space for passage of one or more straps.

\* \* \* \* \*